United States Patent [19]

Hirata et al.

[11] Patent Number: 4,881,450

[45] Date of Patent: Nov. 21, 1989

[54] DRIVE CONTROL SYSTEM FOR HYDRAULIC MACHINE

[75] Inventors: Toichi Hirata, Ushiku; Masakazu Haga; Ichiro Hirami, both of Chiyoda; Kuniaki Yoshida, Tsuchiura, all of Japan

[73] Assignee: Hitachi Construction Machinery Co., Ltd., Tokyo, Japan

[21] Appl. No.: 173,585

[22] Filed: Mar. 25, 1988

[30] Foreign Application Priority Data

Mar. 27, 1987 [JP] Japan .................................. 62-71761
Jun. 10, 1987 [JP] Japan ................................. 62-143185
Jul. 15, 1987 [JP] Japan ................................. 62-174974

[51] Int. Cl.$^4$ ........................................ F15B 13/044
[52] U.S. Cl. ........................................ 91/459; 60/427; 60/484; 91/461
[58] Field of Search ................. 60/427, 484, 399, 406; 91/459, 461

[56] References Cited

U.S. PATENT DOCUMENTS

| | | | |
|---|---|---|---|
| 3,818,926 | 6/1974 | Wohlwend | 60/422 X |
| 4,475,442 | 10/1984 | Breeden | 91/461 |
| 4,516,469 | 5/1985 | Sato et al. | 60/427 X |
| 4,718,329 | 1/1988 | Nakajima et al. | 91/459 X |
| 4,759,183 | 7/1988 | Kreth et al. | 91/459 X |
| 4,763,560 | 8/1988 | Sasaki | 91/459 X |

FOREIGN PATENT DOCUMENTS

| | | |
|---|---|---|
| 0204277 | 12/1986 | European Pat. Off. |
| 2631530 | 1/1978 | Fed. Rep. of Germany |
| 2118167 | 7/1972 | France |
| 2315717 | 1/1977 | France |
| 2537036 | 6/1984 | France |

*Primary Examiner*—Edward K. Look
*Attorney, Agent, or Firm*—Oblon, Spivak, McClelland, Maier & Neustadt

[57] ABSTRACT

A drive control system, which is suitable for use in a hydraulic machine, is equipped with an electric lever device having a manipulation lever and a potentiometer for generating an electrical manipulation signal corresponding to the degree of each manipulation of the lever, a control valve connected to a hydraulic circuit adapted to actuate a hydraulic actuator, and a controller unit equipped with a main controller for receiving the manipulation signal and computing a control signal for the control valve on the basis of the manipulation signal and an output device for generating an electrical actuation signal corresponding to the control signal. The system also includes a neutral position sensing means provided with the electric lever device and adapted to sense a neutral position of the manipulation lever and an inhibition device which receives an output signal from the neutral position sensing means and when the manipulation lever is at the neutral position, inhibits the transmission of a signal between the main controller of the control means and the control valve.

23 Claims, 13 Drawing Sheets

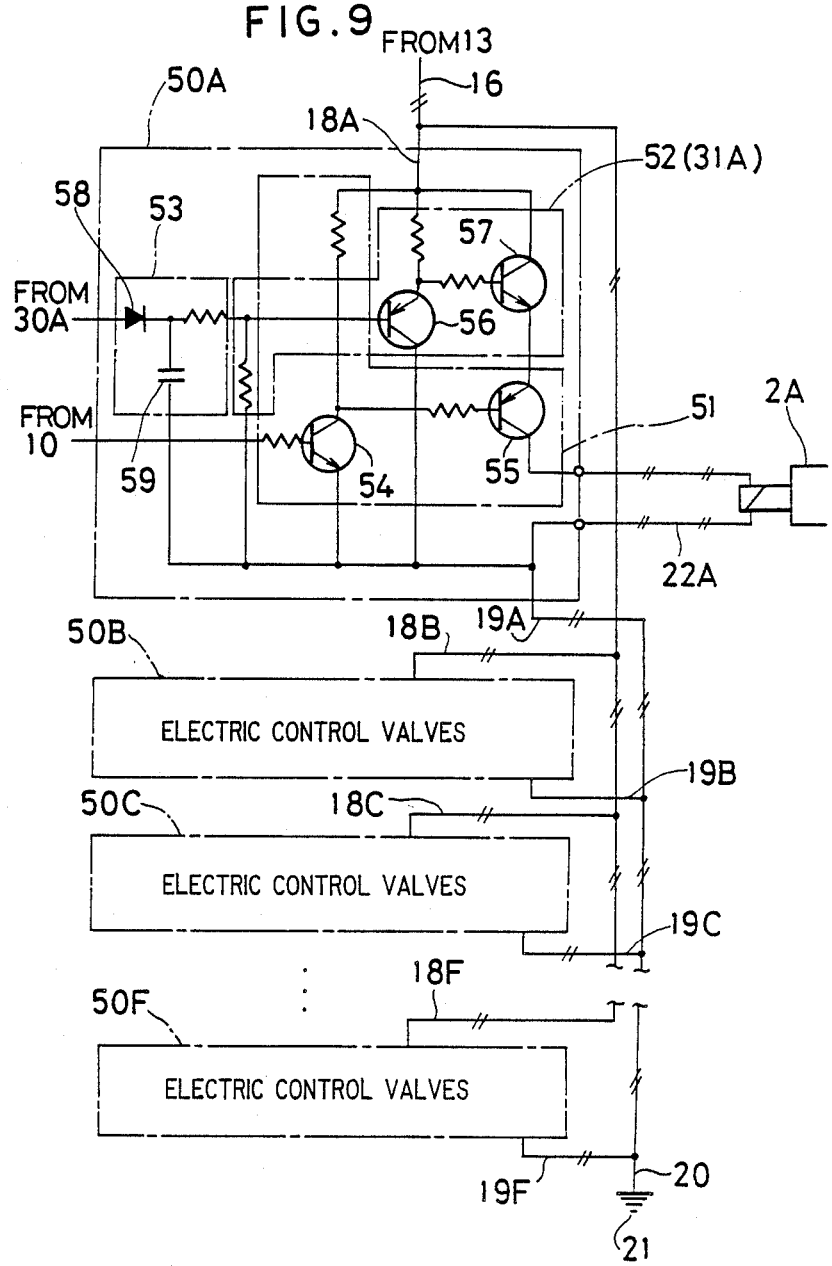

DRIVE CONTROL SYSTEM FOR HYDRAULIC MACHINE

BACKGROUND OF THE INVENTION

This invention relates to a drive control system for a hydraulic machine, specifically, to a drive control system equipped with an electric lever device for controlling the hydraulic actuator of a machine such as a hydraulic shovel.

A machine such as a hydraulic shovel is generally equipped with plural hydraulic actuators. These hydraulic actuators are individually controlled by corresponding actuation control devices which include a manipulation lever device. Specific examples of the actuation control device may include those making use of an electric lever device. Such an electric lever device has a manipulation lever and an output device for generating an electrical manipulation signal corresponding to the degree of manipulation of the lever (for example, a potentiometer), a control valve connected to a hydraulic circuit for actuating a hydraulic actuator, a controller unit having a main controller for receiving the manipulation signal from the electric lever device and computing a control signal for the control valve on the basis of the manipulation signal, and an output device for generating an electrical actuation signal corresponding to the control signal. A main power supply is also provided to drive the controller unit. The controller unit includes a power supply for the main controller and another power supply for the output device. The power supplies are both connected to the main power supply. For plural hydraulic actuators, the corresponding number of control valves, electric lever devices, and output devices of the controller unit are provided.

In such a drive control device, the controller unit is brought into a driven state upon connection of the main controller's power supply and the power supply for the output devices to the main power supply. When the manipulation lever is moved in a given degree from the neutral position, an electrical signal corresponding to the degree of manipulation of the lever is outputted from the potentiometer to the controller unit so that an electrical actuation signal corresponding to the manipulation signal is produced by the main controller and output device of the controller unit. Where the control valve is a solenoid-operated valve, the solenoid-operated valve is actuated directly by the actuation signal. Where the control valve is a hydraulic pilot-operated valve, the electrical actuation signal is converted to a hydraulic signal by an electrical signal/hydraulic signal converter to actuate the hydraulic pilot-operated valve. In response to the actuation of the control valve, the hydraulic actuator is actuated to drive the working member with which the hydraulic actuator is associated.

Where the hydraulic machine is a construction machine (for example, a hydraulic shovel for digging or excavating the earth), the above-mentioned hydraulic actuators are a boom cylinder, an arm cylinder, a bucket cylinder, a swivel motor, etc. The aforementioned working members include a boom driven by the boom cylinder, an arm driven by the arm cylinder, a bucket driven by the bucket cylinder, a swivel cabin driven by the swivel motor, etc.

If a certain problem occurs or if work-induced noise causes jamming in the controller unit, a signal conductor between the electric lever device and the controller unit, or the electric lever device of the above-described conventional drive control system, a false signal may be outputted from the output device of the controller unit to the control valve so that even after the manipulation lever has been shifted back to the neutral position, the control valve takes an actuated position different from the center valve position. As a result, the associated hydraulic actuator and working member are not at their initial positions corresponding to the neutral position of the manipulation lever, leading to a possible safety hazard. Such problems tend to occur especially where a construction machine such as the above-mentioned hydraulic shovel is used, because its working environment is usually severe.

DE A-2631530 discloses a drive control system equipped with an electric lever device in which the electric lever device is provided with a switch for sensing the neutral position of a manipulation lever. While the manipulation lever is at the neutral position, the switch is kept open so as to inhibit the actuation of a manipulation signal output device. Let's assume that such a problem, or noise jamming, has occurred in the electric lever device and a false signal is about to be outputted as a result. The above construction opens the switch when the manipulation lever is shifted back to the neutral position. The actuation of the output device is hence inhibited to avoid the output of the false signal. The safety of the work is hence ensured.

However, in the conventional system described above, the prevention of a false signal occurring due to trouble, or jamming caused by noise or similar trouble is limited to the electric lever device. The conventional system cannot inhibit the output of a false signal when the false signal is produced due to occurrence of trouble, jamming caused by noise or similar trouble in a signal conductor downstream of the electric lever device or in the controller unit. Even when the manipulation lever is at the neutral position, the control valve is actuated to drive the associated hydraulic actuator and working member, resulting in the problem that safety cannot be assured.

SUMMARY OF THE INVENTION

An object of this invention is therefore to provide a drive control system for a hydraulic machine, which even when a trouble, jamming caused by noise or similar trouble occurs at least in a main controller of a controller unit, an electric lever device, a signal conductor between the main controller of the controller unit and the electric lever device or control equipment, does not produce any false signal so long as the manipulation lever is at the neutral position, and safety of work is hence ensured.

In order to achieve the above object, the present invention provides a drive control system for a hydraulic machine. The drive control system includes an electric lever device equipped with a manipulation lever and a first output means for generating an electrical manipulation signal corresponding to the degree of manipulation of the lever, a control valve connected to a hydraulic circuit adapted to actuate a hydraulic actuator, and a control means equipped with a main controller for receiving the manipulation signal and computing a control signal for the control valve on the basis of the manipulation signal, and a second output means for generating an electrical actuation signal corresponding to the control signal. The system additionally comprises a neutral position sensing means provided with the electric lever device and adapted to sense a neutral position of the manipulation lever, and an inhibition means which receives an output signal from the neutral position sensing means, and, when the manipulation lever is at the neutral position, inhibits the transmission of a signal between the main controller of the control means and the control valve.

When the manipulation lever of the electric lever device has been shifted back to the neutral position, the return of the manipulation lever to the neutral position is sensed by the neutral position sensing means. The inhibition means is then actuated by a signal from the neutral position sensing means, so that the transmission of a signal between the main controller of the control means and the control valve is inhibited. Even if a problem o jamming caused by work-induced noise occurs in an electric equipment including the main controller of the control means and a false signal is generated, the false signal is hence not transmitted to the control valve so that the control valve is allowed to return to the center valve position and the hydraulic actuator and the working member driven by the hydraulic actuator are both allowed to return to their initial positions. Safety is hence ensured.

The above inhibition means may be of such a type that the transmission of an electrical signal between the main controller of the control means and the control valve is inhibited. Where the drive control system is equipped with a electric signal/hydraulic signal converter means for converting an electrical actuation signal from the output means of the control means to a hydraulic drive signal (hereinafter abbreviated as "E/H converter") and the control valve is a hydraulic pilot-operated control valve, the inhibition means may be of such a type that the transmission of a hydraulic signal between the E/H converter and the hydraulic pilot-operated control valve is inhibited.

Where the inhibition means inhibits the transmission of an electrical signal between the main controller of the control means and the control valve, the drive control system may be provided additionally with a main power supply to actuate the control means; and the inhibition means may cut off an electrical connection between the main power supply and the control means. In a drive circuit for a hydraulic circuit having one power supply for the main controller and another for the output means, said power supplies being both connected to the main power supply, the inhibition means may cut off an electrical connection between the power supply for the output means and the output means. The inhibition means may also cut off an electrical connection between the output means of the control means and the control valve, an electrical connection between the main controller of the control means and the output means, and/or an electrical connection between the output means of the control means and an earth or ground.

Where the inhibition means inhibits the transmission of a hydraulic signal between the E/H converter and the hydraulic pilot-operated control valve, the inhibition means may cut off the transmission of a hydraulic connection between a hydraulic pressure source for the E/H converter and the E/H converter, or a hydraulic connection between the E/H converter and the control valve.

In a drive control system which is suitable for use in a hydraulic machine and is provided with a plurality of hydraulic actuators and hydraulic circuits of the same types as those described above and, further, with plural control valves, electric lever devices and output means of the control means, said valves, devices and output means being of the same types as the above-described valve, device and output means, in association with the respective hydraulic actuators and hydraulic circuits, the above-described neutral position sensing means is provided with each of the plural electric lever devices. The inhibition means may be constructed of a means which receives signals outputted from the individual neutral position sensing means and outputs an actuation signal when these signals all indicate that the corresponding manipulation levers are at their neutral positions respectively, and a single cut-off means for receiving the actuation signal and collectively inhibiting the transmission of signals between the main controller of the control means and the plural control valves.

In this case, the transmission of electrical signals is collectively inhibited so long as all the manipulation levers are shifted back to their neutral positions. Safety is hence ensured. Since only one cut-off means is required, the structure can be simplified.

The inhibition means may also be constructed of a plurality of cut-off devices adapted to receive signals outputted respectively from the corresponding plural neutral position sensing means. In this case, each cut-off means inhibits the transmission of a signal between the main controller of the control means and its corresponding control valve, while the signal outputted from the corresponding neutral position sensing means indicates that the corresponding manipulation lever is at the neutral position.

When one of the manipulation levers has returned to the neutral position in the above case, the inhibition means corresponding to the manipulation lever which has returned to the neutral position is actuated to cause the corresponding control valve to return without fail to the neutral valve position whether the other manipulation levers are at their neutral positions or not. It is hence possible to prevent the actuation of each control valve by a false signal independently of the manipulation levers of the other control valves. This assures the safety of each hydraulic actuator independently.

Where plural cut-off means are provided, they may cut off electrical connections between the power supply for the plural output means and the corresponding plural output means, electrical connections between the main controller and the corresponding plural output means, electrical connections between the corresponding plural output means and the corresponding plural control valves, or electrical connections between the corresponding plural output means and the earth. The plural cut-off means may also cut off hydraulic connections between the hydraulic pressure source and the corresponding plural E/H converters or hydraulic connections between the corresponding plural E/H converters and the corresponding plural hydraulic pilot-operated control valves.

The above inhibition means may preferably be provided with a delay means for receiving a neutral signal from the neutral position sensing means before the neutral signal is inputted to the cut-off means.

The provision of the delay means enables the input of the neutral signal to the cut-off means with a delay of a predetermined time period. It is hence possible to subject the neutral signal to functional processing at the main controller right after the manipulation lever has been shifted back to the neutral position, thereby avoiding the occurrence of shock on the corresponding working member.

Each electric lever device may preferably be constructed of a movable pusher means responsive to each manipulation of the corresponding manipulation lever, a limiting means for limiting the movement of the pusher means toward the corresponding manipulation lever, a spring means biasing the pusher means toward the corresponding manipulation lever and a linear stroke sensor with which the pusher means is engageable. The corresponding output means and neutral position sensing means are constructed by the linear stroke sensor.

Owing to the above construction, each manipulation of the manipulation lever is transmitted to the linear stroke sensor by way of a movement of the pusher means. When the manipulation lever returns to the neutral position, the pusher means is shifted by the force of the spring means to a position where any further movement of the pusher means is limited by the limiting means. It is hence possible to output an electrical signal corresponding to the degree of the manipulation of the manipulation lever without need for the interposition of any gear engagement, thereby making it possible to avoid the occurrence of a hysteresis loop which would occur when a gear engagement is interposed.

Preferably, the manipulation lever may be supported turnably over 360° by a universal joint and the pusher means may comprise four pushers arranged around the manipulation lever. Since this construction allows the driving of plural pairs of pushers by a single manipulation lever to output an electrical signal from the corresponding linear stroke sensor, it can also be applied suitably for driving plural working members so that the system can be reduced in size.

It is also preferable to arrange the pusher means and linear stroke sensor with a predetermined clearance left therebetween. Even when vibrations are transmitted during operation to the manipulation lever located at the neutral position, the clearance prevents the actuation of the linear stroke sensor and hence ensures excellent manipulation characteristics and safety.

Each of the above electric lever devices may preferably have a casing in which the spring means and mutually opposing portions of the pusher means and linear stroke sensor are enclosed, and the casing defines a bleeder. Owing to the provision of the casing, the pressure is maintained constant inside the casing irrespective of movements of the pusher means and the sensor; seals and the like are kept free from undue loads, whereby excellent durability is assured.

BRIEF DESCRIPTION OF THE DRAWINGS

FIG. 9 is a circuit diagram showing one example of a cut-off device of the drive control system illustrated in FIG. 1;

DESCRIPTION OF THE PREFERRED EMBODIMENTS

The drive control system according to the first embodiment of this invention, which is suitable for use in the hydraulic machine, will be described with reference to FIG. 1.

Figure 1:
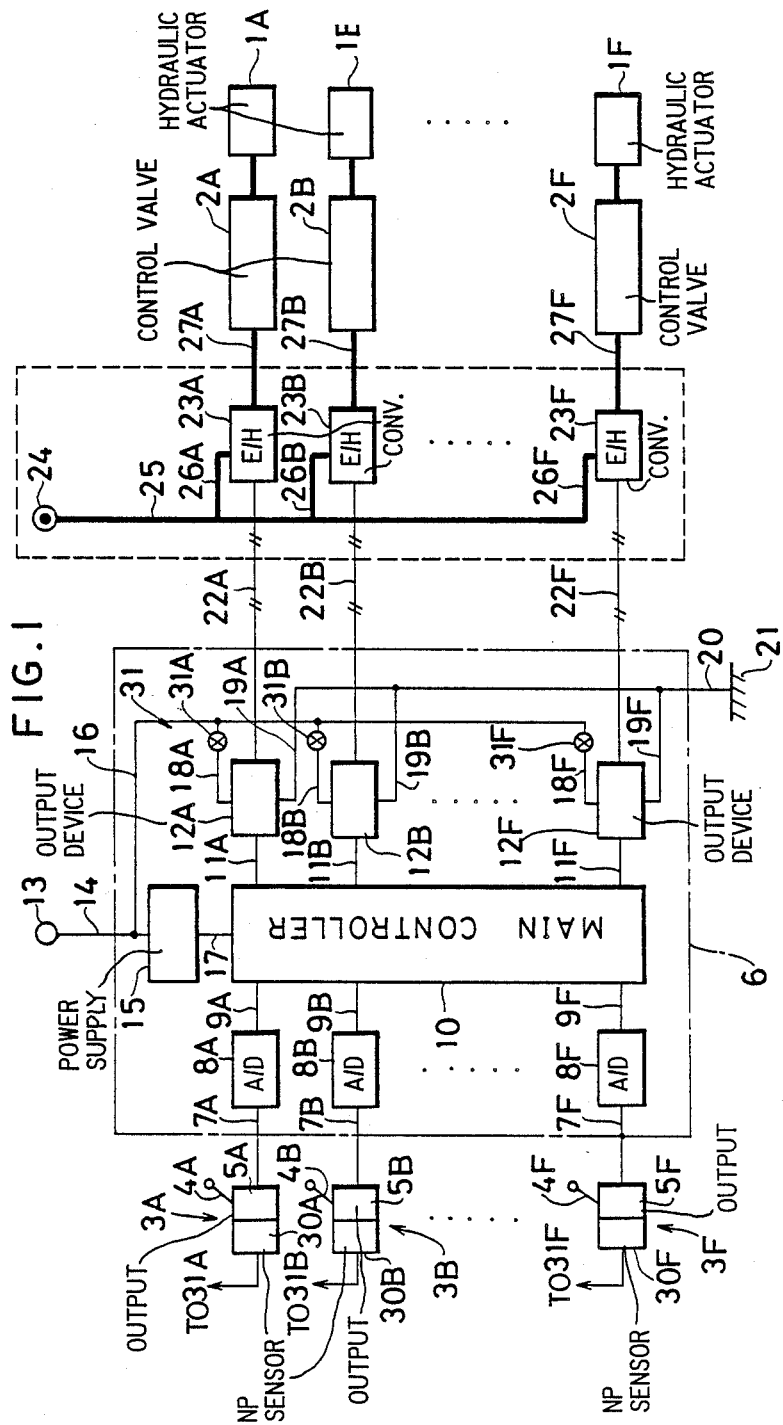
FIG. 1 is a simplified block diagram showing a drive control system according to a first embodiment of this invention, which is suitable for use in a hydraulic machine.

In FIG. 1, symbols 1A-1F indicate plural hydraulic actuators of the hydraulic machine. Where the hydraulic machine is a hydraulic shovel, these hydraulic actuators 1A-1F are a boom cylinder, an arm cylinder, a bucket cylinder, a swivel motor, and left-hand and right-hand travelling motors. Connected to individual hydraulic circuits of these hydraulic actuators 1A-1F are control valves 2A-2F, each of which serves to control the flow rate and direction of a working fluid. The control valves 2A-2F constitute parts of the drive control system for the hydraulic machine. By controlling the control valves 2A-2F, their corresponding hydraulic actuators 1A-1F are actuated under control.

The drive control system including the control valves 2A-2F has plural electric lever devices 3A-3F for the plural hydraulic actuators 1A-1F. The electric lever device 3A is provided with a manipulation lever 4A and an output device (for example, a potentiometer) 5A for generating an electrical manipulation signal corresponding to the degree and direction of each manipulation of the lever 4A. The electric lever devices 3B-3F are constructed similarly. Manipulation signals, which have been produced separately by the potentiometers 5A-5F of the electric lever devices 3A-3F, are fed to a controller unit 6. The controller unit 6 includes input devices, namely, A/D converters 8A-8F for receiving the manipulation signals from the potentiometers 5A-5F via signal conductors 7A-7F and converting the analog quantities of the manipulation signals to digital quantities respectively; a main controller 10 composed of a microcomputer and adapted to receive digital signals from the A/D converters 8A-8F via signal conductors 9A-9F and to compute control signals for the control valves 2A-2F, which control signals correspond of the respective manipulation signals of the electric lever devices 3A-3F; and output devices 12A-12F having, as built-in elements, D/A converters for receiving the control signals computed by the main controller 10 via respective signal conductors 11a-11F and converting the digital quantities of the control signals to analog quantities and unillustrated driver circuits for amplifying the thus-converted analog signals to produce electric actuation signals.

A main power supply 13 is connected to the controller unit 6. The controller unit 6 includes a power supply 15 for the main controller 10 and another power supply 16 for the output devices 12A-12F. The power supplies 15,16 are connected to the main power supply 13 via a common power line 14 so as to control the voltage of the main power supply 13 to desired voltages respectively. The power supply 15 for the main controller 10 is connected to he main controller 10 via a power line 17, so that the main controller 10 is turned on. The power supply 16 for the output devices 12A-12F is connected to the driver circuits of the output devices 12A-12F by way of corresponding power lines 18A-18F. Incidentally, it is assumed that the voltage of the main power supply 13 can be applied, as is, to the output devices 12A-12F in the illustrated embodiment. The power supply 16 for the output devices 12A-12F is therefore composed as a mere power line. The driver circuits of the output devices 12A-12F are connected to the earth or ground 21 by way of their respective earth or ground lines 19A-19F and a common earth or ground line 20.

In the first embodiment, the control valves 2A-2F may be either solenoid-controlled valves equipped with a solenoid, or hydraulically-operated valves equipped with a hydraulic pilot. Where the control valves 2A-2F are solenoid-controlled valves, the electrical actuation signals produced respectively by the output devices 12A-12F are outputted directly to the solenoids of the corresponding control valves 2A-2F via corresponding signal conductors 22A-22F. Where the control valves 2A-2F are hydraulically-operated valves, the drive control system is equipped additionally with E/H converters 23A-23F for converting the electric actuation signals from the corresponding output devices 12A-12F of the control unit 6 to hydraulic actuation signals, a hydraulic pressure source 24, and hydraulic pressure lines 26A-26F connecting the hydraulic pressure source 24 to the respective E/H converters via a common hydraulic pressure line 25. The electric actuation signals produced respectively by the output devices 12A-12F are delivered to unillustrated solenoids of the corresponding E/H converters 23A-23F, where the electric actuation signals are converted to hydraulic actuation signals. The hydraulic actuation signals are then outputted to the corresponding control valves 2A-2F via signal lines 27A-27F.

The general construction of the drive control system for the hydraulic machine has been described above. Let's now assume that a certain problem or jamming caused by work-induced noise has occurred in the controller unit 6, one of the signal conductors 7A-7F between the electric lever devices 3A-3F and the controller unit 6 or one of the electric lever devices 3A-3F and a false signal is produced accordingly. In a drive control system such as that described above, an actuation signal is then outputted on the basis of the false signal from one of the output devices 12A-12F of the controller unit 6 to the corresponding one of the control valves 2A-2F as described above. Said corresponding one of the control valves 2A-2F may hence take an actuated position different from the center valve position even after the corresponding one of the manipulation levers 4A-4F has been shifted back to the prescribed neutral position. Accordingly, the corresponding one of the hydraulic actuators 1A-1F and the working member driven by the hydraulic actuator may not take their initial positions corresponding to the neutral position of the corresponding manipulation lever, leading to the problem that the safety of work cannot be assured. According to the first embodiment, this problem can however be solved by the following construction.

The drive control system further includes neutral position sensing means 30A-30F provided respectively with the electric lever devices 3A-3F and adapted to sense the neutral positions of the manipulation levers 4A-4F and an inhibition means 31 for receiving signals outputted from the neutral position sensing devices 30A-30F and when the manipulation levers 4A-4F are at their neutral positions, inhibiting the transmission of signals between the main controller 10 of the controller unit 6 and the control valves 2A-2F. The inhibition means 31 is constructed of plural cut-off devices 31A-31F which receive signals outputted from the corresponding neutral position sensing devices 30A-30F. The individual cut-off devices are designed in such a way that the transmission of electrical signals between the main controller 10 of the controller unit 6 and the corresponding control valves 2A-2F is inhibited while the signals outputted from the corresponding neutral position sensing devices 30A-30F indicate that the manipulation levers 4A-4F are at their neutral positions. In the first embodiment, the cut-off devices 31A-31F are provided respectively at locations appropriate to cut off the power lines 18A-18F of the output devices 12A-12F.

The neutral position sensing devices 30A-30F may each be constructed, for example, of a limit switch or a switch formed of a conductor and a slider, as will be described subsequently. Each of the cut-off devices 31A-31F may be constructed, for example, of a switching circuit composed of an electronic device such as a transistor or an electromagnetic switch composed of a coil and make-break contacts, as will also be described subsequently.

Let's now assume by way of example that the manipulation lever 4A of the electric lever device 3A has been shifted back to the neutral position in the first embodiment constructed as described above. The return of the manipulation lever 4A to the neutral position is then sensed by the neutral position sensing device 30A to output a neutral signal. The neutral signal is then inputted to the cut-off device 31A. The cut-of device 31A is actuated by the neutral signal to cut-off the electrical connection between the power supply 17 for the output devices and the output device 12A. As a result, the driver circuit of the output device 12A is brought into an inoperative state. Even when trouble or jamming caused by work-induced noise occurs in the controller unit 6 or any one of the electrical equipment provided upstream of the controller unit (namely, in one of the input devices 8A–8F, the main controller 10, one of the output devices 12A–12F, or in one of the signal lines 7A–7F) and a false signal is hence generated as described above, no actuation signal is produced based on the false signal by the output device 12A, provided that the manipulation lever 4A is shifted back to the neutral position. Accordingly, the transmission of an electrical signal between the main controller 10 and the control valve 2A is inhibited. As a result, the control valve 2A returns to the central valve position and the hydraulic actuator 1A and the working member driven by the hydraulic actuator 1A also return to their respective initial positions. Safety is hence ensured.

When the manipulation levers 4B–4F are individually shifted back to their neutral positions, their corresponding cut-off devices 31B–31F are actuated in the same manner so as to ensure safety.

In the first embodiment, the cut-off devices 31A–31F are provided corresponding to the plural manipulation levers 4A–4F. When one of the manipulation levers has returned to the neutral position, the cut-off device corresponding to the manipulation lever returned to the neutral position is actuated to cause the corresponding control valve to return surely to its neutral position whether the other manipulation levers are at their neutral positions or not. It is hence possible to prevent the actuation of each control valve by a false signal independently of the manipulation levers of the other control valves, whereby the safety of each hydraulic actuator is ensured independently of the other hydraulic actuators.

Even when trouble has occurred in one of the control systems, for example, in the output device 12A of the controller unit or an electrical equipment arranged upstream of the output device 12A in the control system for the hydraulic actuator 1A and the manipulation lever 4A of the corresponding electric lever device 3A is held at the neutral position, the other control systems, for example, the output devices 12B–12F of the controller units of the control systems for the hydraulic actuators 1B–1F can be actuated upon manipulation of the manipulation levers 4B–4F of the corresponding electric lever devices 3B–3F. The other control systems can therefore function effectively. It is hence possible to perform temporary or necessary work by using control systems other than a control system that has developed trouble. This is certainly convenient. Let's assume by way of example that the above-described hydraulic machine is a hydraulic shovel and a problem has occurred in the control system for the bucket. The other control systems for the boom, arm and the like can still function even when the manipulation lever for the bucket is at the neutral position. It is hence still possible to perform bucketing temporarily by using the boom or arm. Even when trouble has occurred in the control system for a front attachment, the control systems for the travelling motors are still operable so that the hydraulic shovel can be driven to a repair site by the travelling motors.

The second embodiment of this invention and its modifications will next be described with reference to FIG. 2, in which members equal or equivalent to those shown in FIG. 1 are identified by like reference symbols.

In the first embodiment, the cut-off devices 31A–31F are provided at the locations appropriate to cut off the power lines 18A–18F of the output devices 12A–12F. These locations are however merely illustrative. Similar effects can also be obtained even when the cut-off devices are provided at other locations. FIG. 2 illustrates such embodiments. In order to avoid the inclusion of an unduly large number of drawing sheets, three embodiments in which the cut-off devices are provided at different locations are shown collectively in FIG. 2. One of the three embodiments is called "the second embodiment", while the other two embodiments are called "modifications of the second embodiment".

Figure 2:
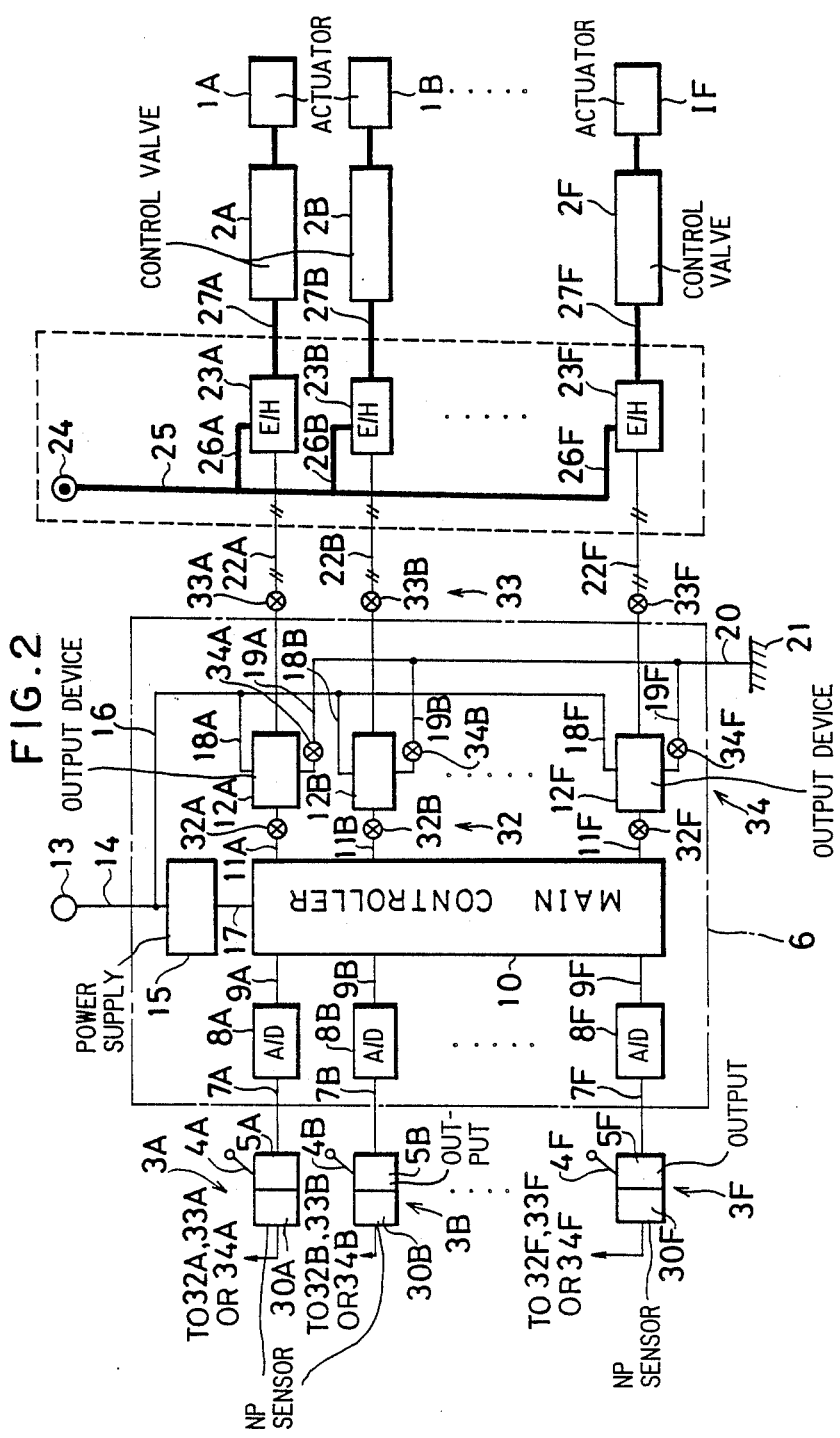
FIG. 2 is a simplified block diagram showing drive control systems according to a second embodiment of this invention and its modifications, each of which is suitable for use in a hydraulic machine.

In the second embodiment depicted in FIG. 2, an inhibition means 32 is constructed of plural cut-off devices 32A–32F provided respectively at locations appropriate to cut-off the signal conductors 11A–11F between the main controller 10 and the output devices 12A–12F. In the first modification, an inhibition means 33 is composed of plural cut-off devices 33A–33F provided respectively at locations appropriate to cut-off the signal conductors 22A–22F between the output devices 12A–12F and the control valves 2A–2F. In the second modification, an inhibition means 34 is constructed of plural cut-off devices 34A–34F provided respectively at locations appropriate to cut-off the earth or ground lines 19A–19F of the output devices 12A–12F.

In the second embodiment equipped with the cut-off devices 32A–32F, the electrical connections between the main controller 10 and the output devices 12A–12F are cut off when the corresponding manipulation levers 4A–4F are shifted back to their neutral positions. Even when a false signal occurs in the main controller 10 of the controller unit 6 or in any one of the electrical equipment arranged upstream of the main controller 10, the false signal is not transmitted to the output devices 12A–12F so that no actuation signal is produced. As in the first embodiment depicted in FIG. 1, the actuation of each control valve by a false signal is hence prevented independently of the manipulation levers of the other control valves so that the safety of each hydraulic actuator is ensured independently of the other hydraulic actuators.

In the first modification having the cut-off devices 33A–33F, the electrical connections between the output devices 12A–12F and their corresponding control valves 2A–2F are cut off when the corresponding manipulation levers 4A–4F are shifted back to their neutral positions. Even when a false signal occurs in the controller unit 6 or in any one of the electrical equipment arranged upstream of the controller unit 6, no actuation signal is transmitted responsive to the false signal from the output devices 12A–12F to the E/H converters 23A–23F or control valves 2A–2F. The actuation of each control valve by a false signal is hence prevented independently of the manipulation levers of the other control valves so that the safety of each hydraulic actuator is ensured independently of the other hydraulic actuators.

In the second modification having the cut-off devices 34A–34F, the electrical connections between the output devices 12A–12F and the earth or ground 21 are cut off when the corresponding manipulation levers 4A–4F are shifted back to their neutral positions. As in the case of the cut-off devices 31A–31F, the output devices 12A–12F are rendered inoperative. Even when a false signal occurs in the controller unit 6 or any one of the electrical equipment arranged upstream of the controller unit 6, no actuation signal is produced responsive to the false signal. Here again, the actuation of each control valve by a false signal is hence prevented independently of the manipulation levers of the other control valves so that the safety of each hydraulic actuator is ensured independently of the other hydraulic actuators.

In the second embodiment and its modifications depicted collectively in FIG. 2, the safety of each control system is also ensured independently of the other control system like the first embodiment illustrated in FIG. 1. In addition, even when trouble has occurred in one of the control systems, the control systems other than the troubled control system can function effectively. It is hence possible to perform temporary or necessary work by using the remaining control systems.

The third embodiment of this invention and its modifications will next be described with reference to FIG. 3, in which members equal to or equivalent to those shown in FIG. 1 are identified by like reference symbols.

In each of the embodiments and modifications described above, the inhibition means is constructed of plural cut-off devices. The inhibition means may however be constructed of a single cut-off device. FIG. 3 illustrates such embodiments. In order to avoid the inclusion of an unduly large number of drawing sheets, three embodiments in which the cut-off device is provided at different locations are shown collectively in FIG. 3. One of the three embodiments is called "the third embodiment", while the other two embodiments are called "modifications of the third embodiment".

Figure 3:
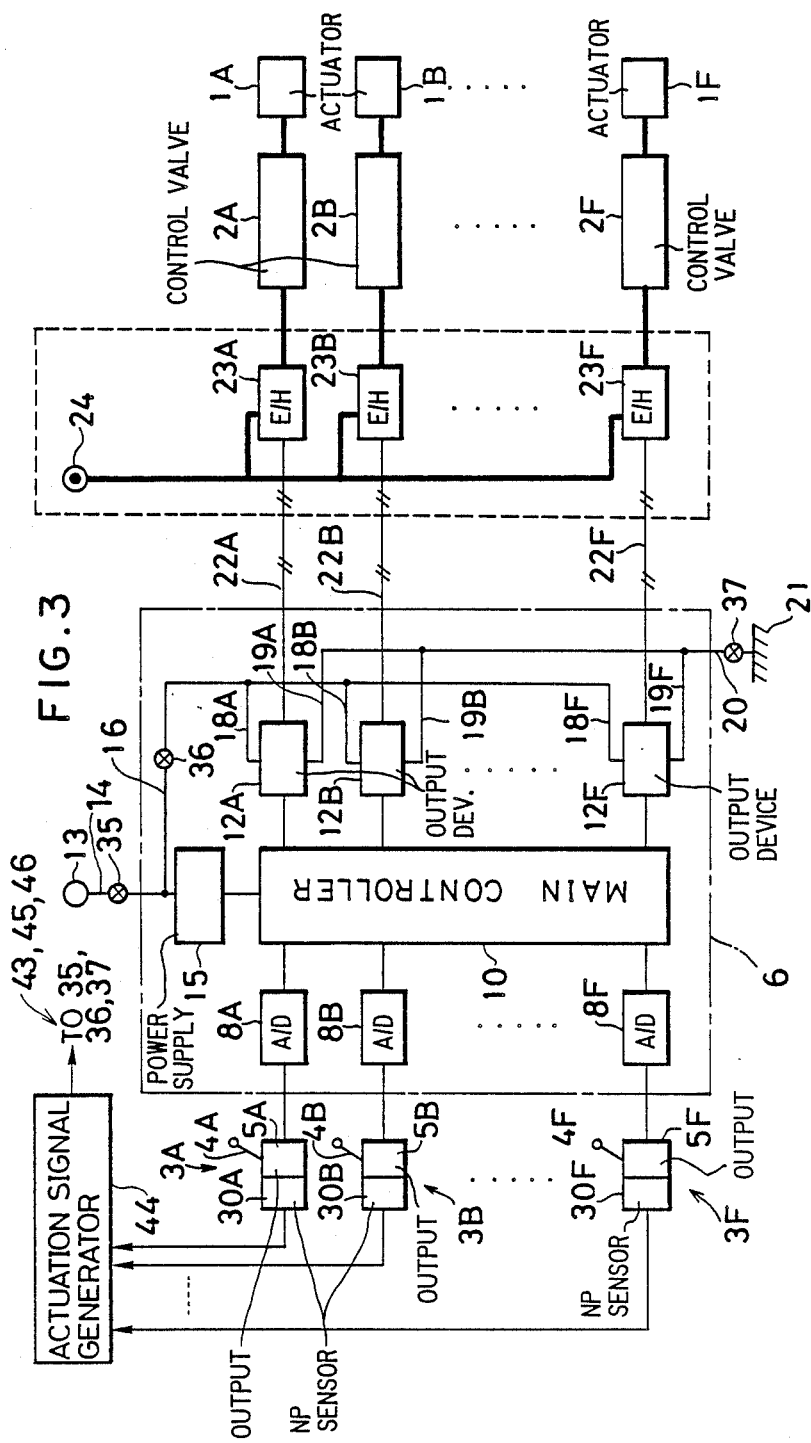
FIG. 3 is a simplified block diagram showing drive control systems according to a third embodiment of this invention and its modifications, each of which is suitable for use in a hydraulic machine.

In the third embodiment depicted in FIG. 3, the drive control system has an inhibition means 43. The inhibition means 43 is constructed of an actuation signal generator 44—which receives neutral signals outputted respectively from the neutral position sensing devices 30A–30F and when all neutral signals have been inputted, outputs an actuation signal—and a single cut-off device 35 for receiving the actuation signal from the generator 44. When all the signals outputted respectively from the neutral position sensing devices 30A–30F indicate that the manipulation levers 4A–4F are at their neutral positions, the transmission of electrical signals between the output devices 12A–12F of the controller unit 6 and the control valves 2A–2F is inhibited collectively. The cut-off device 35 is provided at a location appropriate to cut off the power line 14 common to the power supply 15 for the main controller and the power supply 16 for the output devices.

When the manipulation levers 4A–4F of the electric lever devices 3A–3F have all been shifted back to their neutral positions in the third embodiment equipped with the cut-off device 35, their returns to the neutral positions are sensed by the neutral position sensing devices 30A–30F so that neutral signals are inputted to the actuation signal generator 44. The actuation signal generator 44 then outputs an actuation signal. The actuation signal is thereafter inputted to the cut-off device 35 to actuate the device 35, whereby the electrical connections between the main power supply 13 and the power supply 15 for the main controller and the power supply 16 for the output devices are cut off. As a result, the main controller 10 and output devices 12A–12F are rendered inoperative so that the transmission of electrical signals between the output devices 12A–12F and their corresponding control valves 2A–2F is inhibited. Even when trouble or jamming caused by work-induced noise occurs in the controller unit 6 or any one of the electrical equipment provided upstream of the controller unit, and a false signal is hence generated as described above, no actuation signal is outputted based on the false signal to the control valves 2A–2F, provided that the manipulation levers 4A–4F are all shifted back to their neutral positions. As a result, the control valves return to their central valve positions and the hydraulic actuators 1A–1F and the working members driven by the hydraulic actuators 1A–1F also return to their respective initial positions. Safety is hence ensured.

Figure 8:
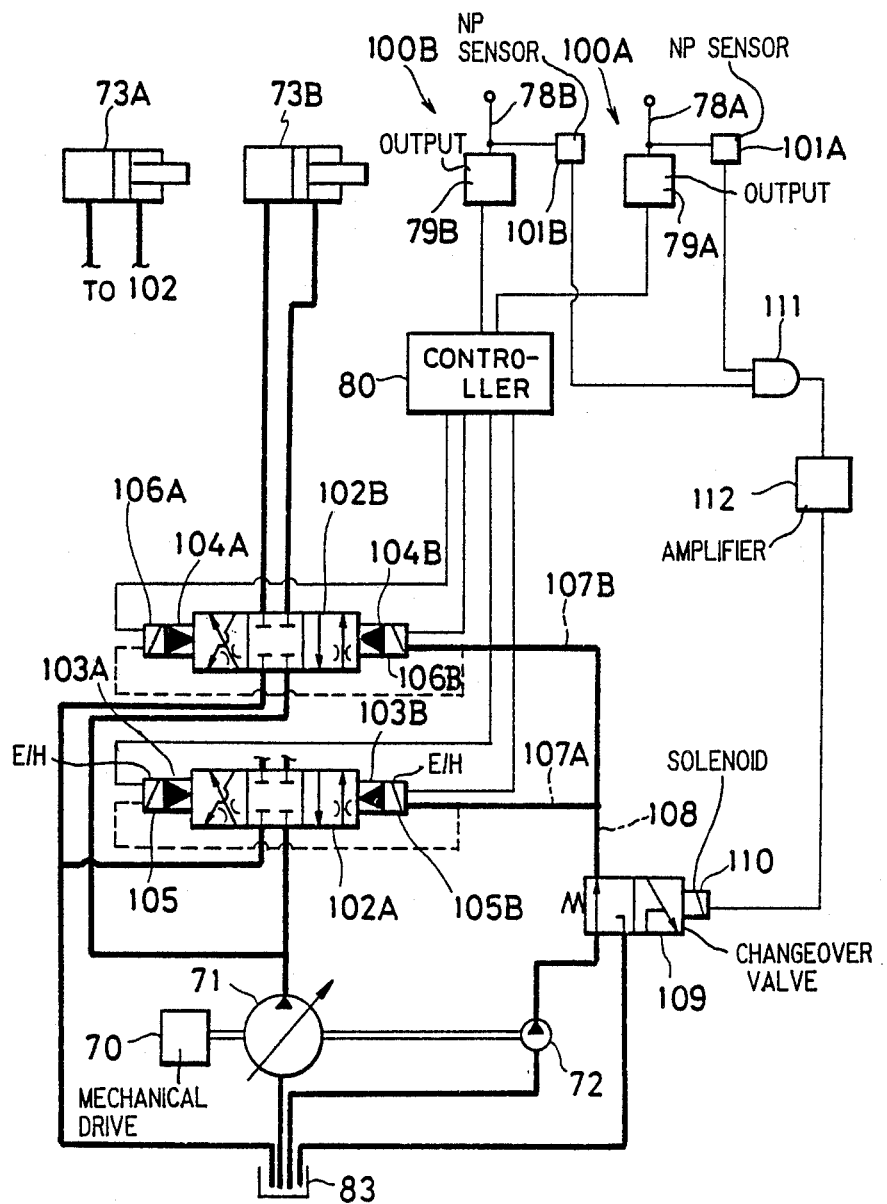
FIG. 8 is a simplified block diagram showing a drive control system according to an eighth embodiment of this invention, which is suitable for use in a hydraulic machine

As will be described subsequently with reference to FIG. 8, the actuation signal generator 44 of the inhibition means 43 may be constructed of an AND circuit which receives each neutral signal as a high level signal and when all high level signals have been inputted, outputs a high level signal as an actuation signal.

In the first modification depicted in FIG. 3, the drive control system has an inhibition means 45. The inhibition means 45 is provided, instead of the cut-off device 35 described above, with a single cut-off device 36 provided at a location appropriate to cut off the power supply 16 for the output devices. In the second modification of the third embodiment, the drive control system has an inhibition means 46. The inhibition means 46 is provided, in place of the cut-off device described above, with a single cut-off device 37 arranged at a location appropriate to cut off the earth or ground line 20 common to the output devices 12A–12F.

In the first modification having the cut-off device 36, the electrical connections between the main power supply 13 and the output devices 12A–12F are collectively cut off when the corresponding manipulation levers 4A–4F are shifted back to their neutral positions. Even when a false signal occurs in the controller unit 6 or any one of the electrical equipment arranged upstream of the controller unit 6, no actuation signal is produced responsive to the false signal so that safety is ensured.

In the second modification having the cut-off device 37, the electrical connections between the output devices 12A–12F and the earth or ground 21 are collectively cut off when the corresponding manipulation levers 4A–4F are shifted back to their neutral positions. Even when a false signal occurs in the controller unit 6 or any one of the electrical equipment arranged upstream of the controller unit 6, no actuation signal is produced responsive to the false signal so that safety is ensured.

According to the third embodiment and its modifications shown collectively in FIG. 3, the transmission of electrical signals is inhibited collectively provided that all the manipulation levers 4A–4F are shifted back to their neutral positions. Safety is hence ensured. Since it is only necessary to provide a single cut-off device, another advantage is that the structure has been simplified.

The cut-off devices 32A-32F, 33A-33F and 34A-34F of the second embodiment and its modifications shown respectively in FIG. 2, as well as the cut-off devices 35-37 of the third embodiment and its modifications depicted in FIG. 3 may each be constructed, for example, by a switching circuit formed of an electronic device such as a transistor or the like, or by an electomagnetic switch formed of a coil and make-break contacts, like the cut-off devices 31A-31F.

The fourth embodiment of this invention and its modification will next be described with reference to FIG. 4, in which members equal to or equivalent to those shown in FIG. 1 are identified by like reference symbols.

In each of the embodiments and modifications described above, the inhibition means inhibits the transmission of electrical signal or signals. In a drive control system equipped with hydraulic pilot-operated control valves, the inhibition means may be designed to inhibit the transmission of a hydraulic signal or signals. FIG. 4 illustrates such embodiments. In order to avoid the inclusion of an unduly large number of drawing sheets, two embodiments in which the cut-off devices are provided at different locations are also shown collectively in FIG. 4. One of the two embodiments is called "the fourth embodiment", while the other embodiment is called "modification of the fourth embodiment".

Figure 4:
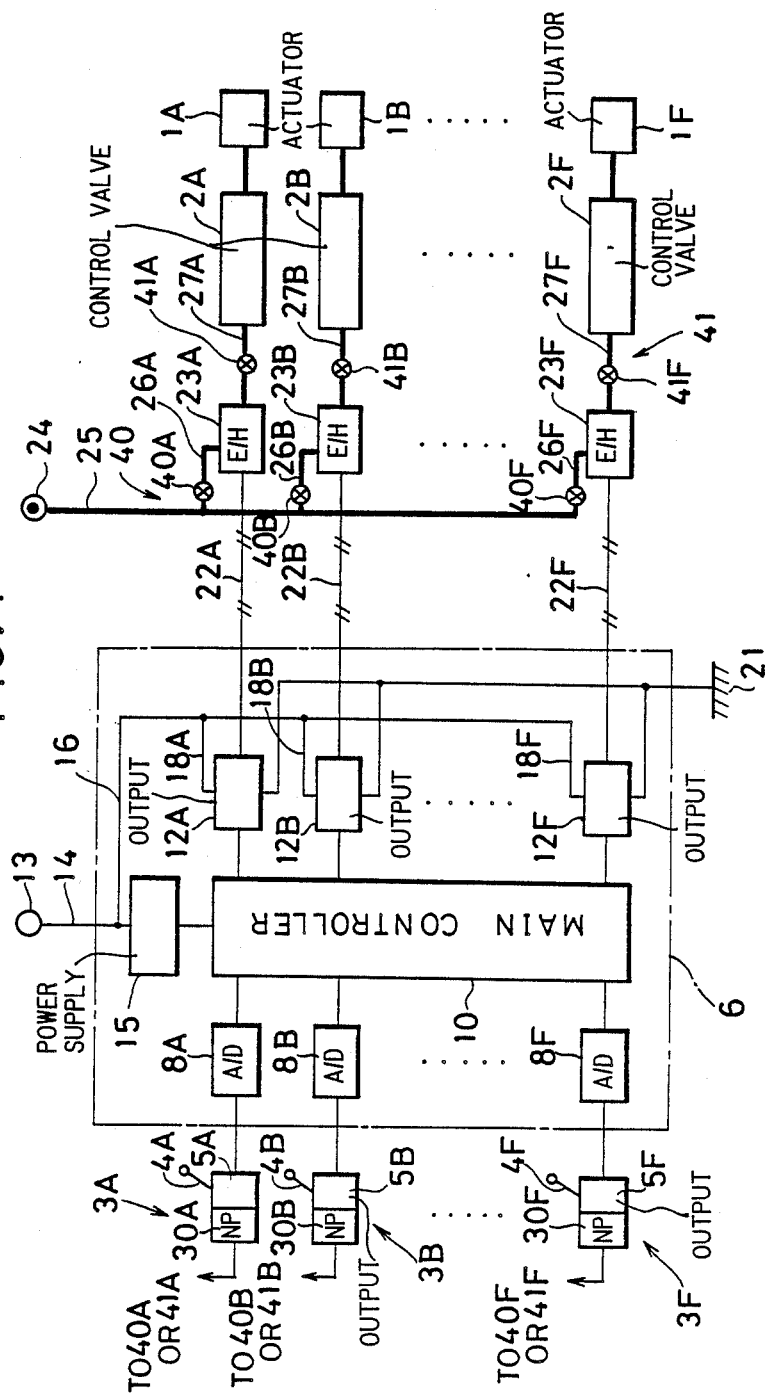
FIG. 4 is a simplified block diagram showing drive control systems according to a fourth embodiment of this invention and its modifications, each of which is suitable for use in a hydraulic machine.

In the fourth embodiment depicted in FIG. 4, the drive control system is equipped with an inhibition means 40 for inhibiting the transmission of hydraulic actuation signals between the E/H converters 23A-23F and their corresponding control valves 2A-2F. The inhibition means 40 is constructed of plural cut-off devices 40A-40F which receive signals outputted respectively from the neutral position sensing devices 30A-30F. The individual cut-off devices inhibit the transmission of hydraulic actuation signals between the E/H converters 23A-23F and their corresponding control valves 2A-2F while the corresponding signals outputted from the neutral position sensing devices 30A-30F indicate that the corresponding manipulation levers 4A-4F are at their neutral positions. In the fourth embodiment, the cut-off devices 40A-40F are provided at locations appropriate to cut off the hydraulic pressure lines 26A-26F of the E/H converters 23A-23F.

The cut-off devices 40A-40F may each be constructed, for example, of a solenoid-operated changeover valve a will be described subsequently.

When the manipulation lever 4A of the electric lever device 3A has been shifted back by way of example to its neutral position in the fourth embodiment equipped with the cut-off devices 40A-40F, the neutral signal of the neutral position sensing device 30 is inputted to the cut-off device 40A so that the cut-off device 40A is actuated to cut off the hydraulic connection between the hydraulic pressure source 24 and the E/H converter 23A. As a consequence, the E/H converter 23A is rendered inoperative. Even when a trouble or jamming caused by work-induced noise occurs in the controller unit 6 or any one of the electrical equipment arranged upstream of the controller unit 6 and a false signal is produced, no actuation signal is produced responsive to the false signal at the E/H converter 23A, provided that the manipulation lever 4A is shifted back to the neutral position. The control valve 2A is thus allowed to return to the valve center position to ensure safety. When the manipulation levers 4B-4F have been shifted back to their neutral positions separately, their corresponding cut-off devices 40B-40F are actuated to ensure safety.

In the modification depicted in FIG. 4, the drive control system has an inhibition means 41. The inhibition means 41 is constructed of cut-off devices 41A-41F provided at locations appropriate to cut off the signal lines 27A-27F between the E/H converters 23A-23F and their corresponding control valves 2A-2F.

When the manipulation levers 4A-4F have shifted back to their neutral positions in the above modification, the hydraulic connections between the E/H converters 23A-23F and their corresponding control valves 2A-2F are also cut off respectively. Even when a false signal occurs in the controller unit 6 or any one of the electrical equipment provided upstream of the controller unit 6, an actuation signal produced responsive to the false signal is not transmitted to the control valves 2A-2F and safety is ensured.

In the embodiment and modification shown collectively in FIG. 4, the actuation of each control valve by false signal can be prevented as described above, irrespective of the control systems for the other control valves, as in the first embodiment depicted in FIG. 1. Even when trouble occurs in one of the control systems, the control systems other than the troubled control system can function effectively. Temporary or necessary work can therefore be performed by using one or more of the remaining control systems.

The fifth embodiment of this invention will next be described with reference to FIG. 5, in which members equal to or equivalent to those shown in FIG. 1 are identified by like reference symbols.

Figure 5:
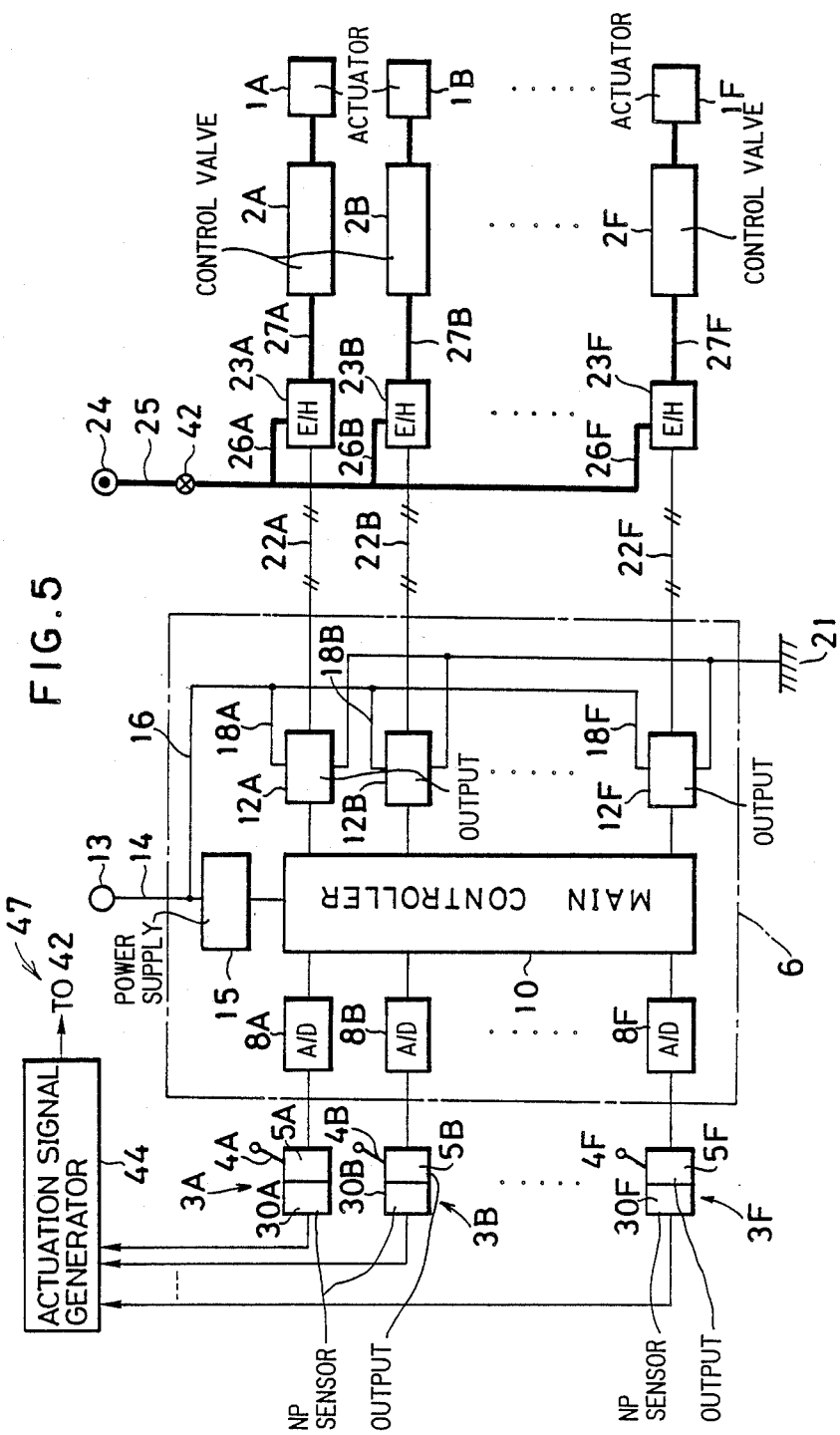
FIG. 5 is a simplified block diagram showing a drive control system according to a fifth embodiment of this invention, which is suitable for use in a hydraulic machine.

In the embodiment depicted in FIG. 5, the drive control system is equipped with an inhibition means 47. The inhibition means 47 includes the above-mentioned actuation signal generator 44—which receives signals outputted respectively from the neutral position sensing devices 30A-30F, and, when all neutral signals have been inputted, outputs an actuation signal—and a single cut-of device 42 for receiving the actuation signal from the generator 44. While all the signals outputted respectively from the neutral position sensing devices 30A-30F indicate that the corresponding manipulation levers 4A-4F are at their neutral positions, the inhibition means 47 inhibits collectively the transmission of hydraulic signals between the E/H converters 23A-23F and their corresponding control valves 2A-2F. Specifically, the cut-off device 42 is provided at a location appropriate to cut off the common hydraulic pressure line 25 between the hydraulic pressure source 24 and the E/H converters 23A-23F.

When the manipulation levers 4A-4F of the electric lever devices 3A-3F have all been shifted back to their neutral positions in the fifth embodiment, the neutral signals for the neutral position sensing devices 30A-30F are all inputted to the actuation signal generator 44 so that an actuation signal is inputted to the cut-off device 42 from the generator 44. The cut-off device 42 is therefore actuated, whereby the hydraulic connections between the hydraulic pressure source 24 and the individual E/H converters 23A-23F are cut off collectively. As a consequence, the E/H converters 23A-23F are rendered inoperative. Even when a trouble or jamming caused by work-induced noise occurs in the controller unit 6 or any one of the electrical equipment arranged upstream of the controller unit 6 and a false signal is produced, no actuation signal is produced responsive to the false signal at the E/H converter 23A, provided that the manipulation levers 4A–4F are shifted back to their neutral positions. The control valves 2A are thus allowed to return to the center valve positions to ensure safety.

As in the third embodiment and its modifications shown collectively in FIG. 3, the fifth embodiment assures the safety of work and requires the provision of only one cut-off device. The fifth embodiment has hence simplified the structure.

Like the cut-off devices 40A–40F, the cut-off devices 41A–41F of the fourth embodiment and its modification depicted collectively in FIG. 4, the cut-off device 42 of the fifth embodiment shown in FIG. 5 may be constructed of a solenoid-operated changeover valve by way of example.

The sixth embodiment of this invention will next be described with reference to FIG. 6. The sixth embodiment is similar to the first modification shown in FIG. 2 and equipped with the inhibition means 33, except that one of the manipulation lever-to-hydraulic actuator systems has been specified further.

Figure 6:
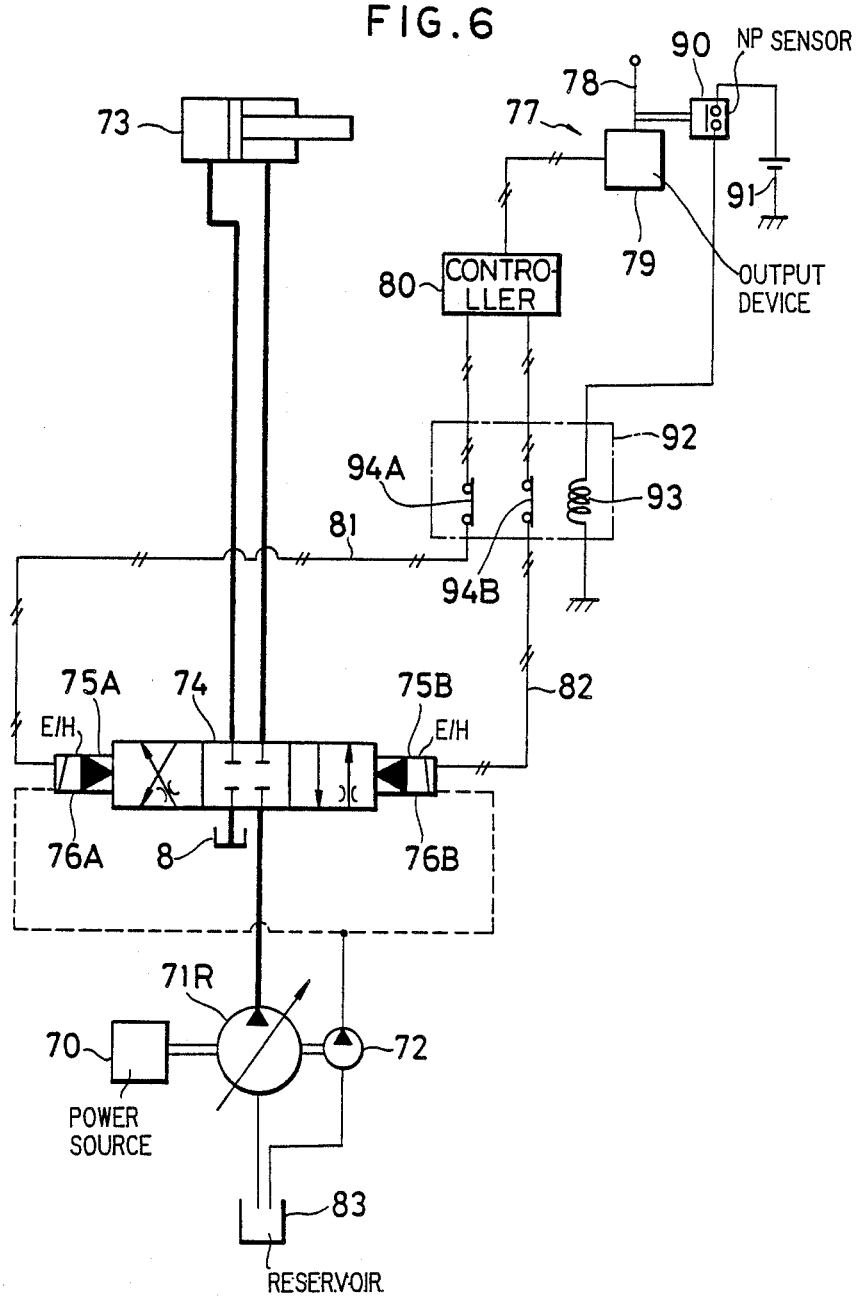
FIG. 6 is a simplified block diagram showing a drive control system according to a sixth embodiment of this invention, which is suitable for use in a hydraulic machine.

In FIG. 6, numeral 70 indicates a power source such as an engine. Connected to the power source 70 are a hydraulic pump 71 and a pilot pump 72. The hydraulic pump 71 feeds a working fluid to a hydraulic cylinder 73 so as to drive the hydraulic cylinder 73. A control valve 74 is interposed between the hydraulic pump 71 and hydraulic cylinder 73. The control valve 74 can be changed over to a center valve position, a right-hand position or a left-hand position as shown in the drawing. By this change-over, the control valve 74 controls the actuation of the hydraulic cylinder 73. The control valve 74 is a hydraulic pilot-operated valve. Hydraulic pilot-operating devices 75A,75B are provided at both ends of the control valve 74. The hydraulic pilot-operating devices 75A,75B are connected to the pilot pump 72 by way of their corresponding solenoids 76A,76B of the E/H converter. A pilot pressure is applied to or removed from the hydraulic pilot-operating devices 75A,75B by energizing or deenergizing the solenoids 76A,76B of the E/H converter, so that the control valve 74 is changed over.

The drive control system including the control valve 74 is equipped with an electric lever device 77 for the hydraulic cylinder 73. The electric lever device 77 has a manipulation lever 78 and an output device 78 which outputs an actuation signal corresponding to the degree and direction of each manipulation of the manipulation lever 78. The actuation signal is then inputted to a controller unit 80. The controller unit 80 is constructed of a microcomputer like the first embodiment depicted in FIG. 1. Specifically, the controller unit 80 has an input device, a main controller and an output device and also includes, as built-in elements, a power supply for the main controller and another power supply for the output device. Both power supplies are connected to an unillustrated power supply. At the controller unit 80, an electric actuation signal corresponding to the manipulation signal is produced for the control valve 75. The actuation signal is outputted to the solenoids 76A,76B of the E/H converter by way of signal conductors 81,82 so as to energize the solenoids. Numeral 83 indicates a reservoir.

The electric lever device 77 also has a neutral position sensing device 90 for sensing that the manipulation lever 78 is at its neutral position. The neutral position sensing device 90 may be constructed, for example, of a limit switch which is closed while the manipulation lever 78 is at the neutral position.

A power supply 91 is connected to the neutral position sensing device 90. An electromagnetic switch 92 is interposed, as a cut-off device making up an inhibition means, in the signal conductors 81,82 which extend between the controller unit 80 and the solenoids 76A,76B respectively. The electromagnetic switch 92 is composed of a coil 93 connected to the power supply 91 via the neutral position sensing device 90 and make-break contacts 94A,94B which are turned on upon energization of the coil 93.

The operation of the drive control system according to the sixth embodiment will next be described. When the manipulation lever 78 has been manipulated and is not at the neutral position, the neutral position sensing device 90 does not operate. Where a limit switch is used by way of example, the limit switch is in an open state so that the power supply 91 and the coil 93 of the electromagnetic switch 92 are not connected to each other. The make-break contacts 94A,94B are hence in a closed state, whereby the solenoids 76A,76B of the E/H converter and the controller unit 89 are connected and the actuation of the hydraulic cylinder 73 is performed as usual.

When it is desired to cause the piston rod of the hydraulic cylinder 73 to extend by way of example, it is necessary to manipulate the manipulation lever 78 in one direction. As a result, a manipulation signal corresponding to the degree and direction of the manipulation of the manipulation lever 78 is outputted from the output device 79 of the electric lever device 77 to the controller unit 80. The controller unit 80 produces an actuation signal responsive to the manipulation signal and then outputs the actuation signal to the solenoid 76A of the E/H converter via the signal conductors 81,82, so that the solenoid 76A is energized. As a consequence, the pilot pressure of the pilot pump 72 is introduced into the hydraulic pilot-operating device 75A to switch the control valve 74 to its left-hand position. The bottom-side compartment and the rod-side compartment of the hydraulic cylinder 73 are hence connected to the hydraulic pump 71 and reservoir 83 respectively, so that the piston rod of the hydraulic cylinder 73 is caused to extend.

On the other hand, when it is desired to cause the piston rod of the hydraulic cylinder 73 to contract, it is necessary to manipulate the manipulation lever 78 in the opposite direction so that the solenoid 76B is energized to switch the control valve 74 to the right-hand position. As a result, the bottom-side compartment and rod-side compartment of the hydraulic cylinder 73 are connected to the reservoir 83 and hydraulic pump 71 respectively.

When the manipulation lever 78 has been shifted to the neutral position on the other hand, the neutral position sensing device 90 is actuated and where a limit switch is used, the limit switch is hence closed. Accordingly, the coil 93 of the electromagnetic switch 92 is energized to open the make-break contacts 94A,94B. The signal conductors 81,82 between the controller unit 89 and solenoids 76A,76B are hence cut off, whereby the solenoids 76A,76B are both deenergized to hold the control valve at the center valve position.

As has been described above, the signal conductors between the controller unit 80 and the solenoids 76A,76B of the E/H converter are always cut off in the sixth embodiment when the manipulation lever is at the neutral position. Even when trouble occurs in the controller unit 80 or in any one of the electrical equipment arranged upstream of the controller unit 80, the control valve can hence be maintained at the center valve position whenever the manipulation lever is at the neutral position. It is accordingly possible to prevent any actuation of the hydraulic cylinder which is not intended by an operator, so that potential danger can be avoided.

Figure 7:
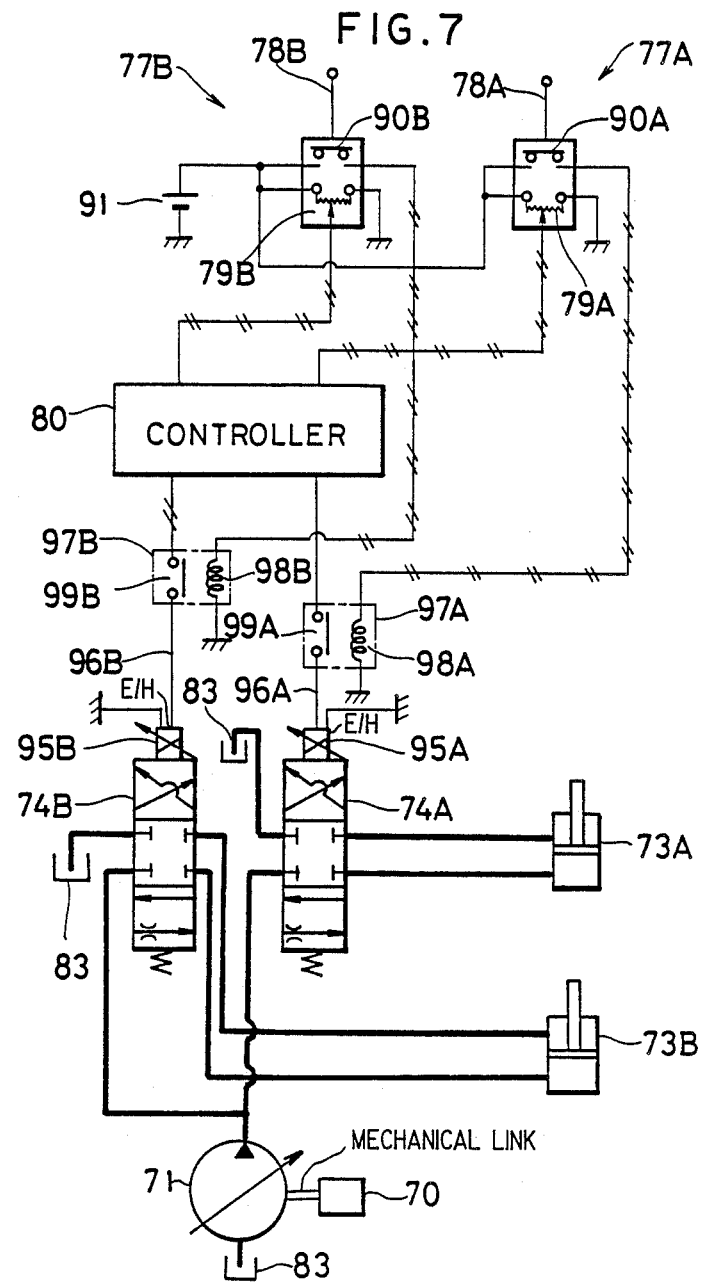
FIG. 7 is a simplified block diagram showing a drive control system according to a seventh embodiment of this invention, which is suitable for use in a hydraulic machine.

The drive control system according to the seventh embodiment of this invention will hereinafter be described with reference to FIG. 7. As in the sixth embodiment depicted in FIG. 6, the first modification shown in FIG. 2 and equipped with the inhibition means 33 has been specified further in the seventh embodiment. Unlike the sixth embodiment of FIG. 6, however, the seventh embodiment includes plural manipulation lever-to-hydraulic actuator systems and employs solenoid-controlled valves as control valves. Members either equal to or equivalent to those shown in FIG. 6 are identified by like reference symbols.

In the seventh embodiment, two systems of hydraulic cylinders 73A,73B-to-electric lever devices 77A,77B are illustrated by way of example. The electric lever devices 77A,77B have manipulation levers 78A,78B, output devices 79A,79B and neutral position sensing devices, for example, limit switches 90A,90B, respectively. The output devices 79A, 79B are constructed as potentiometers.

Two control valves 74A,74B are provided corresponding to the two hydraulic cylinders 73A,73B. The control valves 74A,74B are different in type from the control valve 74 depicted in FIG. 6. Namely, the control valves 74A,74B are solenoid-operated valves equipped with single solenoids 95A,95B respectively. By feeding currents, which are different in both amplitude and direction, to the solenoids 95A,95B, the switching of the control valves 74A,74B is controlled. Actuation signals produced at the controller unit 80 in response to manipulation signals from the electric lever devices 77A,77B are fed to the solenoids 95A,95B via signal conductors 96A,96B respectively. Electromagnetic switches 97A,97B are interposed as cut-off devices making up inhibition means respectively, in the respective signal conductors 96A,96B. The electromagnetic switches 97A,97B are constructed respectively of coils 98A,98B connected to the neutral position sensing devices 90A,90B, and make-break contacts 99A,99B connected to the signal conductors 96A,96B.

While the manipulation lever 78A is at a position other than its neutral position in the seventh embodiment, the limit switch 90A is kept open so that the coil 98A of the electromagnetic switch 97A is maintained in a deenergized state. The make-break contact 99A is therefore in a closed state and the controller unit 80 and solenoid 95A are connected. The actuation of the hydraulic cylinder 73A can therefore be performed as usual.

When the manipulation lever 78A is at the neutral position, the limit switch 90A is closed, the coil 98A is energized, and the make-break contact 96A is brought into an open state. The signal conductor 96A is hence cut off, the solenoid 95A is deenergized, and the control valve 74A is hence held at the center valve position. When the manipulation lever 78B is manipulated, exactly the same operation is also performed as in the case of the manipulation lever 78A.

As has been mentioned above, the safety of the hydraulic actuator of each system is ensured independently of the manipulation lever of the other system like the embodiments and modifications described above. Even when trouble occurs in the electrical equipment of one of the systems, the other hydraulic actuator-to-manipulation lever system can still function effectively. As explained in the description of the first embodiment depicted in FIG. 1, it is possible to perform temporary or necessary work by using the remaining control systems.

The drive control system according to the eighth embodiment of this invention will next be described with reference to FIG. 8. In the eighth embodiment, the fifth embodiment shown in FIG. 5 and equipped with the inhibition means 47 has been specified further. In FIG. 8, members either equal to or equivalent to those depicted in FIGS. 6 and 7 are identified by like reference symbols.

In the eighth embodiment, two systems of hydraulic cylinder 73A,73B-to-electric lever devices 100A,100B are also energized. The electric lever devices 100A,100B are equipped with the manipulation levers 78A,78B, the output devices 79A,79B and neutral position sensing devices 101A,101B respectively. The neutral position sensing devices 101A,101B are designed to output high-level signals when their corresponding manipulation levers 78A,78B have been shifted to their neutral positions.

Control valves 102A,102B are of the same type as the control valve 74 shown in FIG. 6. Specifically, the control valves 102A,102B are both hydraulic pilot-operated valves and are provided at both their ends with hydraulic pilot-operating devices 103A,103B and 104A,104B respectively. The hydraulic pilot-operating devices 103A,103B and 104A,104B are connected to the pilot pump 72 by way of solenoids 105A,105B and 106A,106B of their corresponding E/H converters and their corresponding pilot circuits composed of hydraulic pressure lines 107A,107B and a common hydraulic pressure line 108 respectively. Actuation signals produced at the controller 80 in response to manipulation signals from the electric lever devices 78A,78B are fed to the solenoids 105A,105B and 106A,106B.

A solenoid-operated changeover valve 109 is interposed as a cut-off device of an inhibition means in the common hydraulic line 108 of the pilot circuits. The changeover valve 109 is normally held at the lefthand position by a spring, so that the hydraulic pressure line 108 is maintained in a communicated state to establish communication with the pilot pump 72. Upon energization of the solenoid 110, the changeover valve 109 is switched to the right-hand position so that the hydraulic pressure line 108 is brought into communication with the reservoir 83.

The neutral position sensing devices 101A,101B are connected to an AND circuit, while the AND circuit is connected to an amplification circuit 112 so that an actuation signal is outputted from the amplification circuit 112 to the solenoid 110 of the changeover valve 109. The AND circuit 111 and amplification circuit 112 make up an actuation signal generator.

The operation of the drive control system according to the eighth embodiment will next be described. When the manipulation lever 78A has been manipulated and the manipulation lever 78A is at its neutral position, a low-level signal is outputted from the neutral position sensing device 101A while a high-level signal is outputted from the neutral position sensing device 101B. Therefore, the output of the AND circuit is a low-level signal and no actuation signal is outputted from the amplification circuit 112 accordingly. The changeover valve 109 is not switched and is held at the left-hand position. On the other hand, a manipulation signal is outputted from the output device 79A, an actuation signal is outputted responsive to the manipulation signal from the controller 80, and the solenoid 105A or 105B of the E/H converter is hence energized. As a result, the pilot pressure of the pilot pump 72 is applied to the hydraulic pilot-operating device 103A or 103B, whereby the control valve 102A is switched to actuate the hydraulic cylinder 73A in accordance with the manipulation of the manipulation lever 78A.

The manipulation lever 78B is also manipulated in the same manner. When the manipulation lever 78A is at the neutral position, the hydraulic cylinder 73B is hence actuated in accordance with the manipulation of the manipulation lever 78B.

When the manipulation levers 78A and 78B have been both manipulated, low-level signals are outputted respectively from both neutral position sensing devices 101A and 101B so that the output of the AND circuit 111 is a low-level signal. Here again, the changeover valve 109 is not switched and the changeover valve 109 is maintained at the left-hand position. Accordingly, the hydraulic cylinders 73A and 73B are actuated in accordance with the manipulations of their corresponding manipulation levers 78A and 78B.

When the manipulation levers 78A and 78B are both at their neutral positions, high-level signals are outputted from both neutral position sensing devices 101A and 101B so that the output of the AND circuit 111 is a high-level signal. A high-level signal is hence outputted form the amplification circuit 112 to energize the solenoid 110 of the changeover valve 109. The changeover valve 109 is therefore switched to the right-hand position and the common hydraulic pressure line 108 of the pilot circuits is brought into communication with the reservoir 83. Even when a trouble or jamming caused by noise occurs in the controller unit 80 or the like, a false signal is produced and the solenoids 105A,105B and 106A,106B of the E/H converters are energized, the control valves 102A,102B are thus held at their respective neutral positions to prevent the actuation of the hydraulic cylinders 73A,73B. It is accordingly possible to prevent any actuation of the hydraulic cylinder which is not intended by an operator, so that potential danger ca be avoided.

One example of cut-off devices useful in the above-described drive control systems will next be described with reference to FIG. 9. In this example, the cut-off devices 31A–31F shown in FIG. 1 are each constructed of a switching circuit formed of transistors. In FIG. 9, members either equal to or equivalent to those depicted in FIG. 1 are identified by like reference symbols.

In FIG. 9, symbols 50A–50F indicate electric circuits provided corresponding to the control valves 2A–2F. The electric circuit 50A is constructed of an output circuit 51 corresponding to the driver circuit of the output device 12A, a cut-off circuit 52 corresponding to the cut-off device 31A, and a delay circuit 53 provided for a purpose to be described below.

The output circuit 51 is an amplification circuit formed of first and second transistors 54,55. Inputted as a base current to the first transistor 54 is an analog signal which has been obtained by subjecting a control signal from the main controller 10 to D/A conversion. An amplified actuation signal is outputted from the collector of the second transistor 55 to the control valve 2A. The cut-off circuit 52 is a switching circuit formed of first and second transistors 56,57. While no neutral signal is fed from the neutral position sensing device 30A, the first transistor 56 is in an OFF state while the second transistor 57 is in an ON state. A current is therefore fed from the power supply 13 to the first and second transistors 54,55 of the output circuit, so that the transistors 54,55 are rendered conductive. When a neutral signal is inputted from the neutral position sensing device 30A to the base of the first transistor 56 via the delay circuit 53, the first transistor 56 is turned on while the second transistor 57 is turned off. As a result, the first and second transistors 54,55 of the output circuit 51 are rendered non-conductive, so that the output of an amplified signal from the output circuit 51 is inhibited.

The delay circuit 53 is constructed of a reverse-current preventing diode 58 and a capacitor 59 adapted to set a delay time period. A neutral signal inputted in the capacitor 59 is prevented from reaching the cut-off circuit 52 by a predetermined time lag which corresponds to the capacity of the capacitor 59.

Figure 10A:
FIGS. 10(A) through 10(D) are diagrammatic representations, to which reference will be made upon explanation of reasons for the provision of a delay circuit with the cut-off device depicted in FIG. 9.
Figure 10B:
Figure 10C:
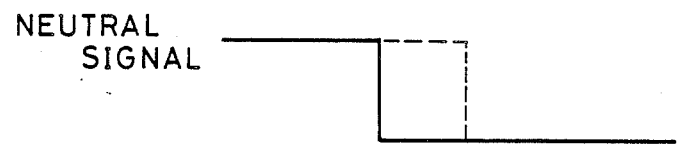
Figure 10D:
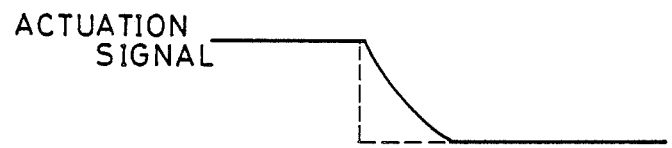

Reasons for the provision of the delay circuit 53 will now be described with reference to FIG. 10. The main controller 10 of the controller unit 6 subjects a manipulation signal from the potentiometer 5A of the electric lever device 3A to functional processing and then outputs the thus-processed value as a control signal. The wave form of the manipulation signal and that of the control signal are therefore not in conformity. Let's now assume by way of example that the manipulation lever 4A has been shifted back abruptly to the neutral position and the manipulation signal has hence been changed stepwise as shown in FIG. 10(A). The control signal from the main controller 10 does not however change stepwise in correspondence to the manipulation signal but changes gradually as depicted in FIG. 10(B). This is to avoid a situation where the associated working member is stopped abruptly, producing a shock. On the other hand, the neutral signal changes stepwise at this time in response to the manipulation of the manipulation lever 4A as illustrated by a solid line in FIG. 10(C). If the neutral signal should be fed directly to the cut-off circuit 52, the actuation signal to be outputted from the output circuit 51 will change stepwise as indicated by a broken line in FIG. 10(D) so that a large shock will be produced on the working member. By providing the delay circuit 53 and inputting the neutral signal with the predetermined time lag to the cut-off circuit 52 as illustrated by a broken line in FIG. 10(C), the actuation signal changes gradually with a waveform subjected to the functional processing like the control signal as indicated by a solid line in FIG. 10(D). It is hence possible to prevent the waveform of the control signal, which has been subjected to the functional processing, from being invalidated, so that smooth operation of the working member is realized.

The electric circuits 50B–50F shown in FIG. 9 are constructed in the same manner as the electric circuit 50A.

One example of electric lever devices useful in the above-described drive control systems will next be described with reference to FIG. 11 through FIG. 19.

Figure 11:
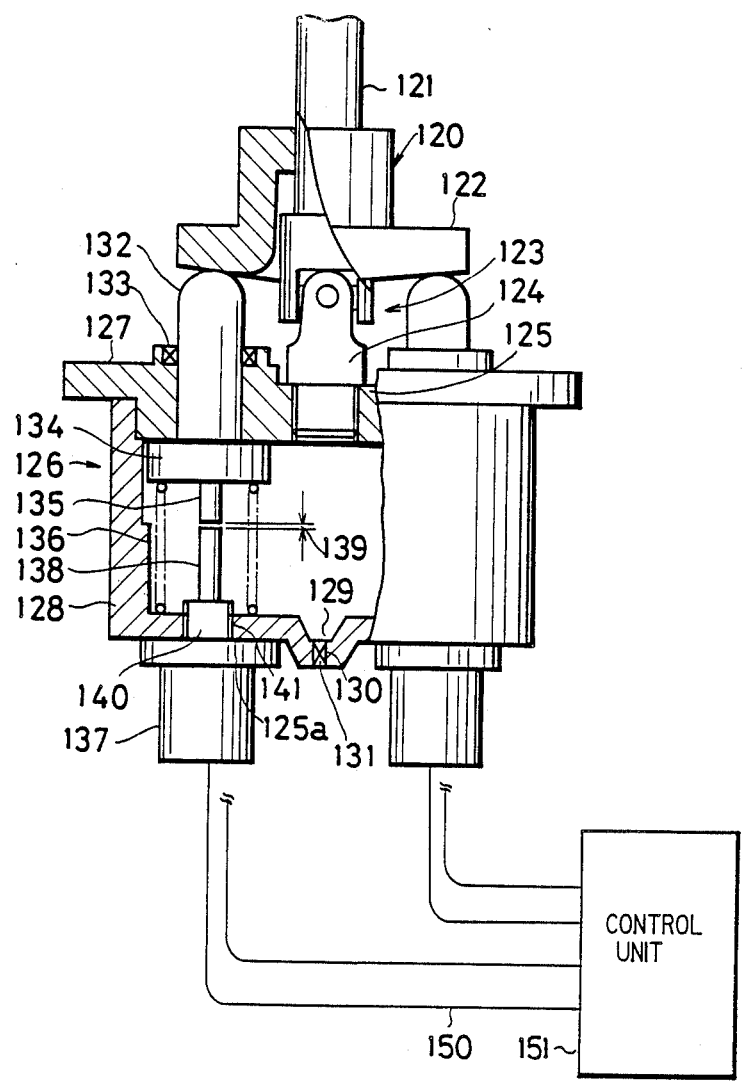
FIG. 11 is a side view of one example of an electric lever device, in which some elements are shown in cross-section.

In FIG. 11, numeral 120 designates a manipulation lever. The manipulation lever 120 is composed of a rod 121 and a presser plate 122 fixed integrally to the lower extremity of the rod 121 and having a lower surface formed into a slightly-curved surface. The lever 120 is supported on a support 124 by way of a universal joint 123 which allows the lever 120 to rotate over 360°. A thread is formed in the lower end portion of the support 124. The support 124 is screwed in an internally-threaded hole formed in a casing 126 which forms a main body, with a sealing 125 interposed between the support 124 and casing 126. The casing 126 is formed of an upper lid 127 and a box 128 onto which the upper lid 127 fits as an integral member. A recess 129 is formed in the lower part of the box 128. A bleeder 130 is formed in communication with the recess 129. A filter 131 is arranged inside the bleeder 130.

Figure 12:
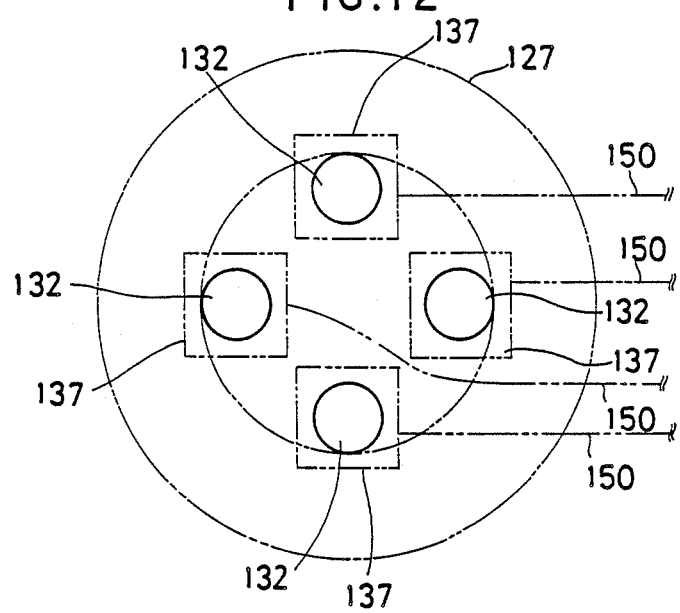
FIG. 12 is a plan view of the exemplary electric lever device, showing the arrangement of pushers.

Four pushers 132, which are movable linearly, are arranged in such a way that the pushers 132 are in contact with the lower surface of the presser plate 122 of the manipulation lever 120 and as shown in FIG. 12, the pushers 132 surround the rod 121 (not shown in FIG. 12) of the lever 120. The pushers 132 are provided to extend through the upper lid 127 and their corresponding sealings 133. Each pusher 132 has a large-diameter portion 134 at the lower end thereof and a projection 135 extending downwardly from the large-diameter portion 134. The large-diameter portion 135 of the pusher 132 can be brought into contact with the upper lid 127, so that the upper lid 127 serves as a limiting member for limiting the movement of the pusher 132 toward the lever 120. Inside the casing 126, a spring 136 is provided to urge each pusher 132 toward the lever 120. One end of the spring 136 is maintained in engagement with the large-diameter portion 134 of the corresponding pusher 132, while the other end of the spring 136 is kept in engagement with the bottom wall of the box 128 of the casing 126.

In opposition to each pusher 132, a linear stroke sensor 137 is arranged. As will be described below, the sensor 137 is equipped, as built-in members, with an output device for outputting an electrical signal corresponding to the degree and direction of each manipulation of the manipulation lever 120 and a neutral position sensing device for sensing that the manipulation lever 120 is at its neutral position. The sensor 137 is arranged in such a way that an actuating pin 138 of the sensor 137 is located inside the casing 126. Moreover, the pusher 132 and sensor 137 are arranged in such a way that a clearance 139 forming a zone insensitive to the lever 120 is left between the projection 135 of the pusher 132 and the actuating pin 138 of the sensor 137. A threaded portion 141 is formed in the inner wall of a guide portion 140 for guiding the actuating pin 138. Each sensor 137 is mounted on the casing 126 in such a way that a threaded portion 141 of the guide portion 140 is screwed in an internally-threaded hole formed in the box 128 of the casing 126 with a sealing 125a interposed between the sensor 137 and the bottom wall of the box 128. The threaded portion 141 of the guide portion 140 forms a means for making the dimension of the clearance 139 variable.

Figure 13:
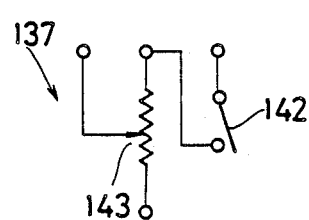
FIG. 13 is an electric circuit diagram of a linear stroke sensor provided with the electric lever device.
Figure 14:
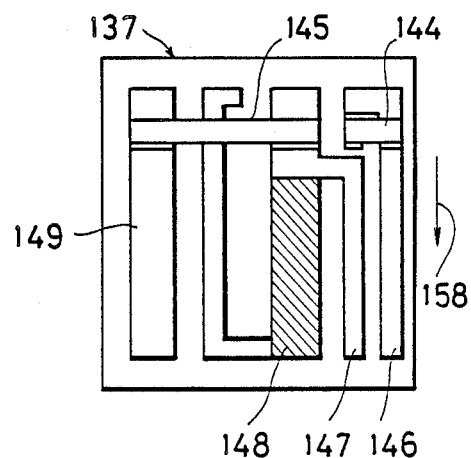
FIG. 14 is a front view showing the internal structure of the linear stroke sensor which makes up the electric circuit.
Figure 15:
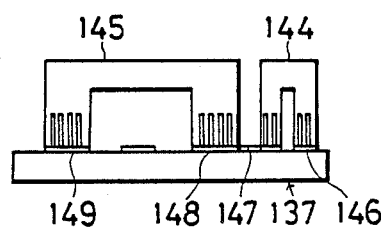
FIG. 15 is a side view of the linear stroke sensor.

As illustrated in FIG. 13, each of the above-described sensors 137 is equipped with an electric circuit. The electric circuit has a switch 142 and a variable resistor 143. The switch 142 serves to sense that the manipulation lever is at its neutral position, while the variable resistor 143 outputs an electric signal corresponding to the degree of each manipulation of the manipulation lever. The internal structure of each sensor 137 is illustrated in FIG. 14 and FIG. 15. Specifically, each sensor 137 is provided integrally with the actuating pin 138 described above and is provided with sliders 144,145 movable up and down as viewed in FIG. 14, a conductor 146 with which the slider 144 is always maintained in contact, a conductor 147 with which the slider 144 and slider 145 are selectively brought into contact, a resistor 148 provided in continuation with the conductor 147, and a conductor 149 with which the slider 145 is always maintained in contact. Incidentally, the switch 142 depicted in FIG. 13 and described above is constructed by the conductors 146,147 and the slider 144. The variable resistor 143 shown in FIG. 13 is constructed by the conductor 147, resistor 148, conductor 149 and slider 145.

Figure 16:
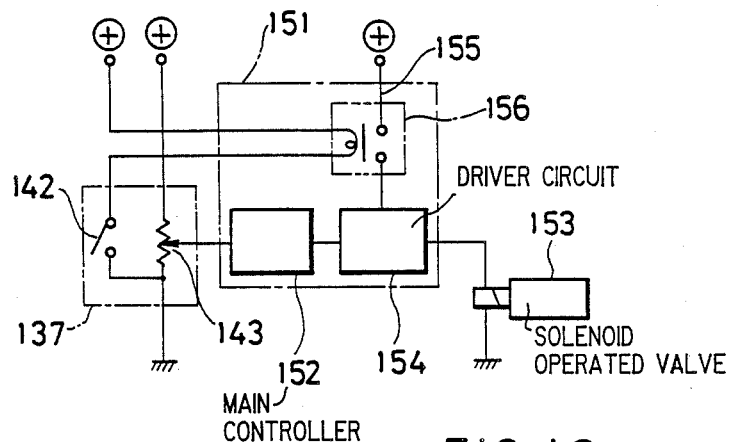
FIG. 16 is a circuit diagram showing the manner of connection among the linear stroke sensor, a controller unit, a cut-off device and a control valve.

The variable resistor 143 of each sensor 137 is connected to a control unit adapted to perform various signal processings, namely, to a controller unit 151 by way of a signal conductor 150 as illustrated in FIG. 11. As shown in FIG. 16, the controller unit 151 is equipped with a main controller 152, a driver circuit 154 for outputting a signal for actuating a solenoid-operated valve 153 which controls the actuation of a hydraulic actuator for driving a working member of a hydraulic machine, and an electromagnetic switch 156 connected as a cut-off device to a power line 155 of the driver circuit 154. The coil of the electromagnetic switch 156 is connected to a switch 142 built in the sensor 137. When the switch 142 is closed, the coil of the electromagnetic switch 156 is energized to close its make-break contacts. The connection between the power supply and the driver circuit 154 is hence established. When the switch 142 is opened, the make-break contacts are opened to cut off the power line 155 of the driver circuit 154 so that the driver circuit 154 is rendered inoperative.

Where the working member driven by the hydraulic actuator is a boom, arm, bucket, swivel cabin, etc. of a hydraulic shovel, two opposing sensors 137 of the four sensors 137 form an output device for one working member. Therefore, the two opposing sensors 137 are both connected to the same control valve 153 by way of the controller unit 151.

When the manipulation lever 120 shown in FIG. 11 has been manipulated, for example, in a direction indicated by arrow 157 from the neutral position to drive a specific working member in the exemplary electric lever device constructed in the above-described manner, the pusher 132 located on the left-hand side as viewed in FIG. 11 is shifted downwards against the force of the spring 136 by the pressure plate 122 of the lever 120. The projection 135 of the pusher 132 is then brought into contact with the actuating pin 138 of the sensor 137. A further movement of the projection 135 causes the actuating pin 138 to move and at the same time, the sliders 144,145 shown in FIG. 14 move in a direction indicated by arrow 58 in FIG. 14. When the slider 144 is brought into contact with both conductors 146,147, the switch 142 shown in FIG. 16 is turned on so that the electromagnetic switch 156 depicted in FIG. 16 is also turned on. In other words, the power line 155 is connected. Furthermore, the slider 145 is connected to the resistor 148 and conductor 149 so that an electrical signal corresponding to the degree of the manipulation of the lever 120 is outputted to the main controller 152 of the controller unit 151. A control signal corresponding to the electric signal is outputted from the main controller 152 to the driver circuit 154 and an actuation signal is then outputted from the driver circuit 154 to the actuation portion of the solenoid-controlled valve 153, whereby an unillustrated hydraulic actuator is actuated so that an associated working member is driven in accordance with the degree of the manipulation of the manipulation lever 120.

When the manipulation lever 120 has been manipulated in a direction opposite to arrow 157 in FIG. 11, the pusher 132 located on the right-hand side as viewed in FIG. 11 moves downwards so that the same working member is driven in a direction opposite to the direction mentioned above, in the manner described above.

When the manipulation lever 120 has been shifted back to the initial neutral position, the pusher 132 is allowed to move upward by the return force of the spring 136 shown in FIG. 11 to a position where the large-diameter portion 134 of the pusher 132 is limited by the upper lid 127 of the casing 126. Concurrently with the upward movement of the pusher 132, the actuating pin 138 of the sensor 137 also moves upwards to the position shown in FIG. 11, so that the sliders 144,145 illustrated in FIG. 14 take such a positional relation as shown in FIG. 14. Namely, the slider 145 is separated from the resistor 148 first of all. The slider 144 is then separated from the conductor 147, whereby the switch 142 is turned on. When the slider 145 is separated from the resistor 148 as mentioned above, a signal for shifting the associated working member to the neutral position is outputted from the sensor 137 to the controller unit 151 and the control valve 153 returns to the center valve position in response to the signal outputted from the driver circuit 154. When the above-described switch 142 has been turned off, the electromagnetic switch 156 is turned off to stop the actuation of the driver circuit 154.

When the manipulation lever 120 has been manipulated in a direction perpendicular to arrow 157 in FIG. 11 (namely, in the vertical direction perpendicular to the horizontal direction as seen in FIG. 12), the corresponding pusher 132 is shifted in the same manner as described above so that an electrical signal is outputted from the corresponding sensor 137 to drive another working member different from the above-described working member.

In the example constructed in the above-described manner, the movement of the pusher 132 caused by the manipulation of the manipulation lever 120 and the movement of the actuating pin 138 of the sensor 137 caused by the movement of the pusher 132, allowed an electrical signal corresponding to the degree of the manipulation of the lever 120 to be outputted from the sensor 137 without the need for interposition of a gear engagement such as that in the prior art.

Furthermore, the distance until the pusher 132 and the actuating pin 138 of the sensor 137 engage each other, namely, the clearance 139 forms an insensitive zone for the rotation of the lever 120. By turning the threaded portion 141 of the guide portion 140 of the sensor 137 suitably, the clearance 139 can easily be adjusted to a desired value. In other words, the insensitive zone can be adjusted to any desired value with ease. Although the insensitive zone can be set easily to a desired value, no rattling takes place since the pushers 132 are biased upwards by their corresponding springs 136 and the pushers 132 are maintained in contact with the presser plate 122 of the lever 120.

In addition, at the neutral return position of the manipulation lever 120, each pusher 132 always remains at the same position limited by the upper lid 127 of the casing 126, namely, by the limiting member. It is hence possible to obtain stable operability without forming a hysteresis loop by the manipulation and subsequent return of the manipulation lever unlike the conventional gear engagement with its accompanying rattle, so that stable operability is obtained.

By providing around the single manipulation lever 120 the two pairs, namely, the four pushers 132, adapted to drive two working members, the drive of these two working members can be used so that the size of the system can be reduced.

Even when vibrations are transmitted to the lever 120 positioned in the neutral state upon performing certain work, the vibrations are not transmitted to the lever 120 kept in a neutral state owing to the provision of the clearance 139 between the pusher 132 and the actuating pin 138 of each sensor 137. No false signal is hence outputted from the sensor 137, thereby making the system extremely safe.

Each sensor 137 is equipped with the switch 142 for sensing that the manipulation lever 120 is a its neutral position. Even when trouble or jamming caused by noise occurs in the signal system including the controller unit 151, the power line 155 is cut off as described above whenever the manipulation lever 120 is shifted to the neutral position. Accordingly, the actuation of the driver circuit 154 is stopped, the control valve 152 is allowed to return to the center valve position, and the corresponding working member is brought into a state corresponding to the neutral state of the manipulation lever 120. Excellent safety is also exhibited in this regard.

Since the bleeder 13 is formed through the casing 126 as described above, the internal pressure of the casing 126 is maintained constant irrespective of the movement of the pushers 132 so that the sensors 137, sealings 125,125a,133 and the like are kept free from undue loads and hence have superb durability.

In addition, the recess 129 is formed in the box 128 of the casing 126. Even when dew forms inside the casing 126 due to variations in the surrounding temperature or the like, the dewdrops collect in the recess 129 and are allowed to flow out through the filter 131. The sensors 137 can hence be protected from dew.

Owing to the provision of the filter 131 in the bleeder 130 of the casing 126, external dust and the like are not allowed to enter the casing 126. The sensors 137 and the individual sliding parts are also protected by the provision of the filter 131.

When dewdrops accumulate in the recess 129, they pass through the filter 131 when they flow out of the casing 126. Therefore, the filter 131 is washed and is always maintained in a clean state.

Figure 17:
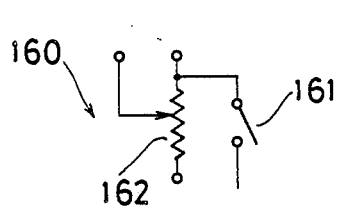
FIG. 17 illustrates another example of the electric circuit of the linear stroke sensor.
Figure 18:
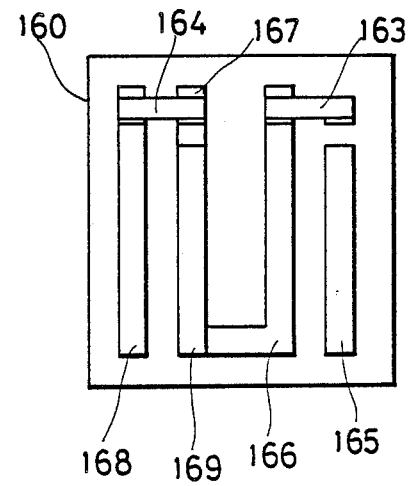
FIG. 18 is a front view showing the internal structure of a linear stroke sensor which has materialized the electric circuit of FIG. 17.
Figure 19:
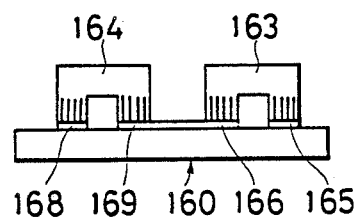
FIG. 19 is a side view of the linear stroke sensor of FIG. 18.

Other examples of the electric circuit and internal structure of the above-described sensor 137 will next be described with reference to FIG. 17 through FIG. 19. In these examples, each sensor 160 has a switch 161 and variable resistor 162 arranged in a different fashion from those provided in the electric circuit depicted in FIG. 13. The internal structure of the sensor 160 is illustrated in FIGS. 18 and 19. Specifically, the sensor 160 has sliders 163,164 provided integrally with the actuating pin 138 described above and movable up and down as viewed in FIG. 18, a conductor 165 with which the slider 163 is selectively brought into contact, a conductor 167 with which the slider 163 is always maintained in contact, a conductor 167 with which the slider 164 is selectively brought into contact, a conductor 168 with which the slider 164 is always maintained in contact, and a resistor 169 with which the slider 164 is selectively brought into contact. The resistor 169 is provided in continuation with the conductors 166,167. The switch 161 shown in FIG. 17 is formed by the conductors 165,166 and slider 163, while the variable resistor 162 depicted in FIG. 17 is formed by the conductor 167, resistor 169, conductor 168 and slider 164.

It will be understood that such a construction also functions in the same manner as the sensors 137 shown in FIG. 13 through FIG. 15.

Since the above-described electric lever device is constructed to transmit each stroke of the manipulation lever as movements of the pushers to the corresponding linear stroke sensors, it is possible to output an electric signal corresponding to the stroke of the manipulation lever without need for interposition of any gear engagement. It is hence possible to avoid the occurrence of a hysteresis loop which occurs when a gear engagement is interposed and also to to set up a desired insensitive zone, thereby obtaining superb operability and safety compared with conventional electric lever devices.

By a single manipulation lever, plural pairs of pushers can be actuated to output electric signals from the corresponding linear stroke sensors. Accordingly, the electric lever device can also be used suitably to drive plural working members. In this case, the device can be constructed smaller than conventional electric lever devices.

A switch is provided to sense that the manipulation lever is at its neutral position. Even when trouble or jamming caused by noise occurs in a signal system to which linear stroke sensors are connected, a signal corresponding to the neutral position is outputted from the switch so long as the manipulation lever is shifted back to the neutral position. It is hence possible to make the associated working member return to the initial state on the basis of the signal. Hence, excellent safety is also assured in this regard.

In each of the preceding embodiments, modifications and examples, each cut-off device of the inhibition means was described as a device adapted to cut off the transmission of a current or hydraulic pressure in an ON/OFF manner. The cut-off device should however be not interpreted as being limited to such a device. Each cut-off device may be designed to reduce the current or hydraulic pressure, which is to be transmitted to an output device of a controller unit, an E/H converter or a control valve, to a level insufficient to actuate the output device, E/H converter or control device. It will be understood easily that similar effects can be achieved by such a cut-off device. The term "inhibition" as used herein should therefore be interpreted in a broad sense so as to include not only "100% cut-off" but also "reduction to a level insufficient to actuate an output device, E/H converter, control device or the like".

We claim:

1. A drive control system for a hydraulic machine, including an electric lever device equipped with a manipulation lever and a first output means for generating an electrical manipulation signal corresponding to the degree of each manipulation of the lever, a control valve connected to a hydraulic circuit adapted to actuate a hydraulic actuator, and a control means equipped with a main controller for receiving the manipulation signal and computing a control signal for the control valve on the basis of the manipulation signal and a second output means for generating an electrical actuation signal corresponding to the control signal, characterized in that said system additionally comprises a neutral position sensing means provided with the electric lever device for sensing a neutral position of the manipulation lever and an inhibition means which receives an output signal from the neutral position sensing means and when the manipulation ever is at the neutral position, inhibits the transmission of a signal between the main controller of the control means and the control valve.

2. The system as claimed in claim 1, wherein said inhibition means inhibits the transmission of an electrical signal between the main controller of said control means and the control valve.

3. The system as claimed in claim 1, wherein said system further comprises a main power supply for actuating said control means and said inhibition means cuts off an electrical connection between the main power supply and said control means.

4. The system as claimed in claim 1, wherein said system further comprises a main power supply for actuating said control means, said control means has a first power supply for said main controller and a second power supply for said output means, the first power supply and second power supply are both connected to the main power supply and said inhibition means cut off an electrical connection between the second power supply for said output means and said power output means.

5. The system as claimed in claim 1, wherein said inhibition means cuts off an electrical connection between said output means of said control means and the control valve.

6. The system as claimed in claim 1, wherein said inhibition means cuts off an electrical connection between the main controller of said control means and said output means.

7. The system as claimed in claim 1, wherein said inhibition means cuts off an electrical connection between the output means of said control means and an earth.

8. The system as claimed in claim 1, wherein said system further comprises an electrical signal/ hydraulic signal conversion means for converting an electrical actuation signal from said output means of said control means to a hydraulic actuation signal, the control valve is a hydraulic pilot-operated control valve, and said inhibition means inhibits the transmission of a hydraulic signal between said electrical signal/hydraulic signal conversion means and the hydraulic pilot-operated control valve.

9. The system as claimed in claim 1, wherein said system further comprises a hydraulic pressure source and an electrical signal/hydraulic signal conversion means for converting an electrical actuation signal from said output means of said control means to a hydraulic actuation signal, the control valve is a hydraulic pilot-operated control valve, and said inhibition means inhibits a hydraulic connection between the hydraulic pressure source and said electrical signal/hydraulic signal conversion means.

10. The system as claimed in claim 1, wherein said system further comprises an electrical signal/ hydraulic signal conversion means for converting an electrical actuation signal from said output means of said control means to a hydraulic actuation signal, the control valve is a hydraulic pilot-operated control valve, and said inhibition means inhibits a hydraulic connection between said electrical signal/hydraulic signal conversion means and the control valve.

11. The system as claimed in claim 1, wherein said system comprises a plurality of hydraulic actuators of the same type as the hydraulic actuator, the corresponding number of hydraulic circuits of the same type as the hydraulic circuit, the corresponding number of control valves of the same type as the control valve, the corresponding number of electric lever devices of the same type as the electric lever device and the corresponding number of output means of said control means, said output means are of the same type as said second output means, the plurality of electrical lever devices are provided respectively with neutral position sensing means of the same type as the neutral position sensing means, and said inhibition means has a means—which receives output signals from said individual neutral position sensing means and when all the output signals indicate that their corresponding manipulation levers are at respective neutral positions, outputs an actuation signal—and a single cut-off means for receiving the actuation signal and inhibiting collectively the transmission of signals between the main controller of the control means and the respective control valves.

12. The system as claimed in claim 1, wherein said system comprises a plurality of hydraulic actuators of the same type as the hydraulic actuator, the corresponding number of hydraulic circuits of the same type as the hydraulic circuit, the corresponding number of control valves of the same type as the control valve, the corresponding number of electric lever devices of the same type as the electric lever device and the corresponding number of output means of said control means, said output means are of the same type as said second output means, the plurality of electrical lever devices are provided respectively with neutral position sensing means of the same type as the neutral position sensing means, and said inhibition means is constructed of the corresponding number of plural cut-off means for receiving output signals respectively from the plurality of neutral position sensing means, and each of said cut-off means inhibits the transmission of a signal between the main controller of said control means and the corresponding one of the control valves when an output signal from the corresponding one of said neutral position sensing means indicates that the corresponding manipulation lever is at a neutral position.

13. The system as claimed in claim 12, wherein said system further comprises a main power supply for actuating said control means, said control means has a first power supply for said main controller and a second power supply for said plural output means, the first power supply and second power supply are both connected to the main power supply, and said plural cut-off means cut off electrical connections between the second power supply for said plural output means and said corresponding plural output means.

14. The system as claimed in claim 12, wherein the plural cut-off means cut off electrical connections between the main controller and said corresponding plural output means.

15. The system as claimed in claim 12, wherein the plural cut-off means cut off electrical connections between said plural output means of said control means and the corresponding plural control valves.

16. The system as claimed in claim 12, wherein the plural cut-off means cut off electrical connections between the corresponding plural output means and an earth.

17. The system as claimed in claim 12, wherein said system further comprises a hydraulic pressure source and a plurality of electrical signal/hydraulic signal conversion means for converting electrical actuation signals from said corresponding plural output means of said control means to hydraulic actuation signals respectively, the plural control valve are hydraulic pilot-operated control valves, and said cut-off means cut off hydraulic connections between the hydraulic pressure source and the corresponding plural electrical signal/hydraulic signal conversion means.

18. The system as claimed in claim 12, wherein said system further comprises a plurality of electrical signal/hydraulic signal conversion means for converting electrical actuation signals from said corresponding plural output means of said control means to hydraulic actuation signals respectively, the plural control valves are hydraulic pilot-operated control valves, and said plural cut-off means cut off hydraulic connections between said corresponding plural electrical signal/ hydraulic signal conversion means and the corresponding plural hydraulic pilot-operated control valves.

19. The system as claimed in claim 1, wherein said inhibition means comprises a delay means for receiving a neutral signal from said neutral position sensing means and a cut-off means for inhibiting transmission of a signal between the main controller of said control means and the control valve.

20. The system as claimed in claim 1, wherein said electric lever device comprises a pusher means movable responsive to each manipulation of the manipulation lever, a limiting means for limiting the movement of said pusher means toward the manipulation lever, a spring means biasing said pusher means toward the manipulation lever and a linear stroke sensor with which said pusher means is engageable, and said output means and neutral position sensing means are constructed by the linear stroke sensor.

21. The system as claimed in claim 20, wherein the manipulation lever is supported turnably over 360° by a universal joint and said pusher means comprises four pushers arranged around the manipulation lever.

22. The system as claimed in claim 20, wherein said pusher means and the linear stroke sensor are arranged with a predetermined clearance left therebetween.

23. The system as claimed in claim 20, wherein the electric lever device additionally comprises a casing in which said spring means and mutually opposing portions of said pusher means and linear stroke sensor are enclosed, and the casing defines a bleeder.

* * * * *